(12) United States Patent
Tabuchi

(10) Patent No.: US 7,289,695 B2
(45) Date of Patent: Oct. 30, 2007

(54) OPTICAL SWITCHING DEVICE AND OPTICAL MEMBER UNIT

(75) Inventor: Haruhiko Tabuchi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/083,924

(22) Filed: Mar. 21, 2005

(65) Prior Publication Data

US 2006/0120662 A1 Jun. 8, 2006

(30) Foreign Application Priority Data

Dec. 7, 2004 (JP) ............... 2004-354443

(51) Int. Cl.
*G02B 6/26* (2006.01)
*G02B 6/42* (2006.01)
*G02B 6/28* (2006.01)

(52) U.S. Cl. ............... 385/16; 385/18; 385/24

(58) Field of Classification Search ............ 385/16–24, 385/33, 37; 347/228
See application file for complete search history.

(56) References Cited

U.S. PATENT DOCUMENTS

| 5,748,812 A * | 5/1998 | Buchin ............... 385/18 |
| 6,694,073 B2 * | 2/2004 | Golub et al. ............ 385/18 |
| 6,963,678 B2 * | 11/2005 | Werkheiser et al. ....... 385/18 |
| 2002/0164109 A1 | 11/2002 | Oikawa et al. ........... 385/17 |
| 2004/0027446 A1 * | 2/2004 | Kato et al. ............. 347/228 |

FOREIGN PATENT DOCUMENTS

| JP | 54-038147 | 3/1979 |
| JP | 55-022723 | 2/1980 |
| JP | 2001-356283 | 12/2001 |
| JP | 2002-258177 | 9/2002 |
| JP | 2003-241239 | 8/2003 |

* cited by examiner

*Primary Examiner*—Quyen P Leung
(74) *Attorney, Agent, or Firm*—Staas & Halsey LLP

(57) ABSTRACT

The present invention relates to an optical switching device capable of reducing the number of members such as a movable mirror for reflecting light beams to a relatively small number and suppressing the deterioration of the yield. The optical switching device is configured so as to include an input light deflection section capable of outputting a light beam as a deflected light beam at a plurality of different angles on the same plane, a collimated light output section capable of outputting the deflected light beam from the input light deflection section as a collimated light beam having passed any one of optical axes in a relationship of parallel translation to each another in accordance with the angle, and an output direction-path guide section for guiding the collimated light beam from the collimated light output section to the output direction-path in accordance with the optical axis.

15 Claims, 18 Drawing Sheets

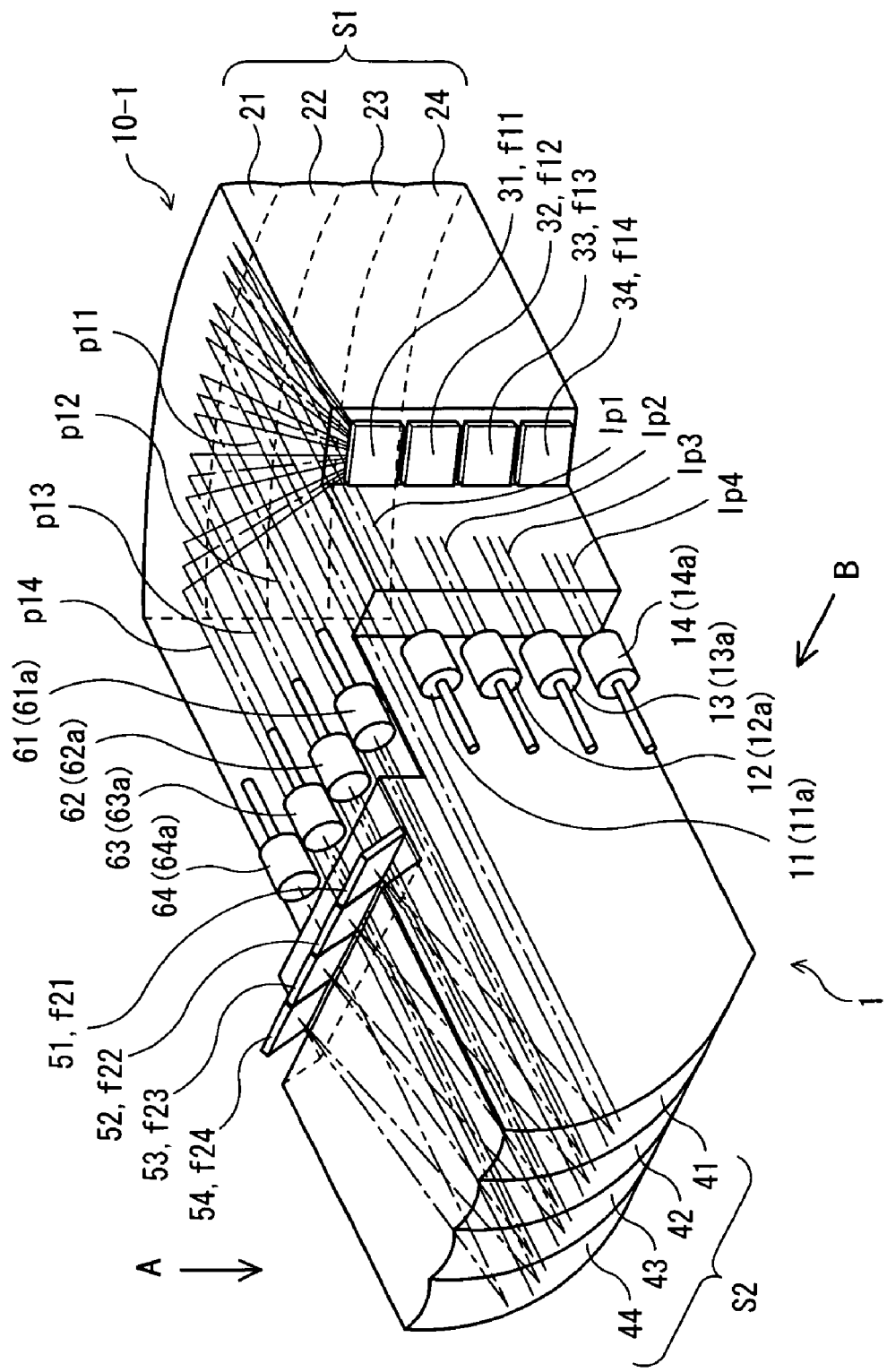

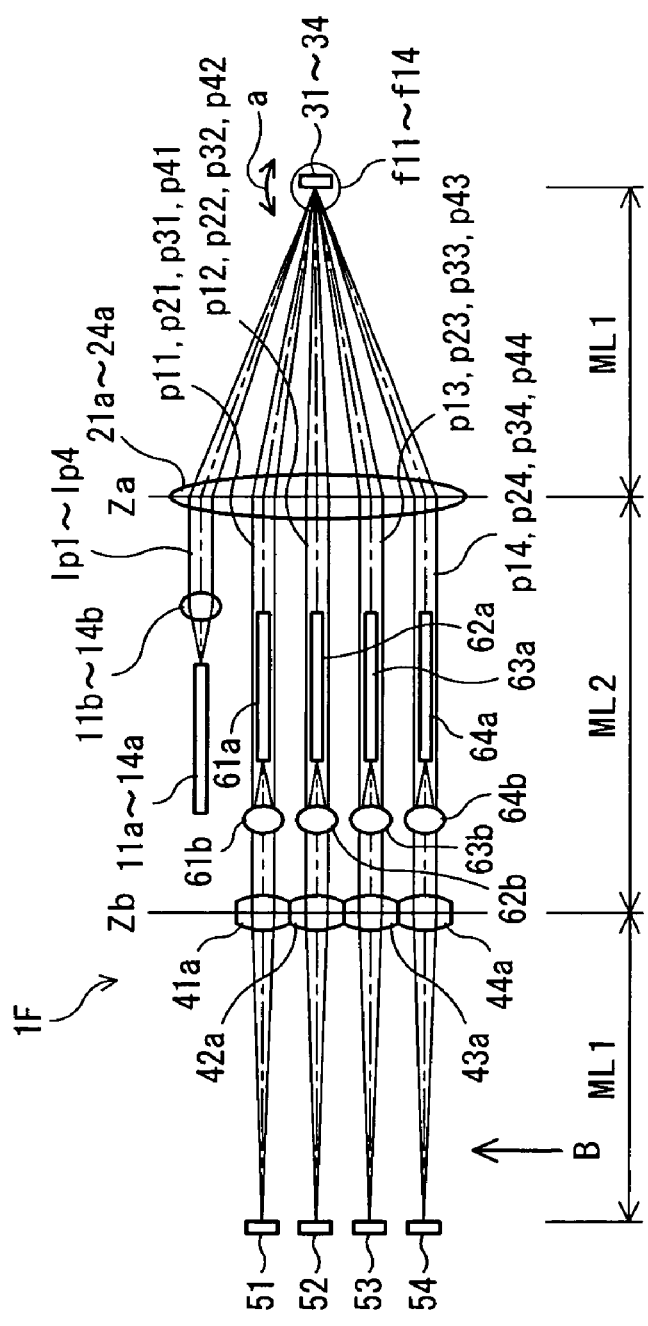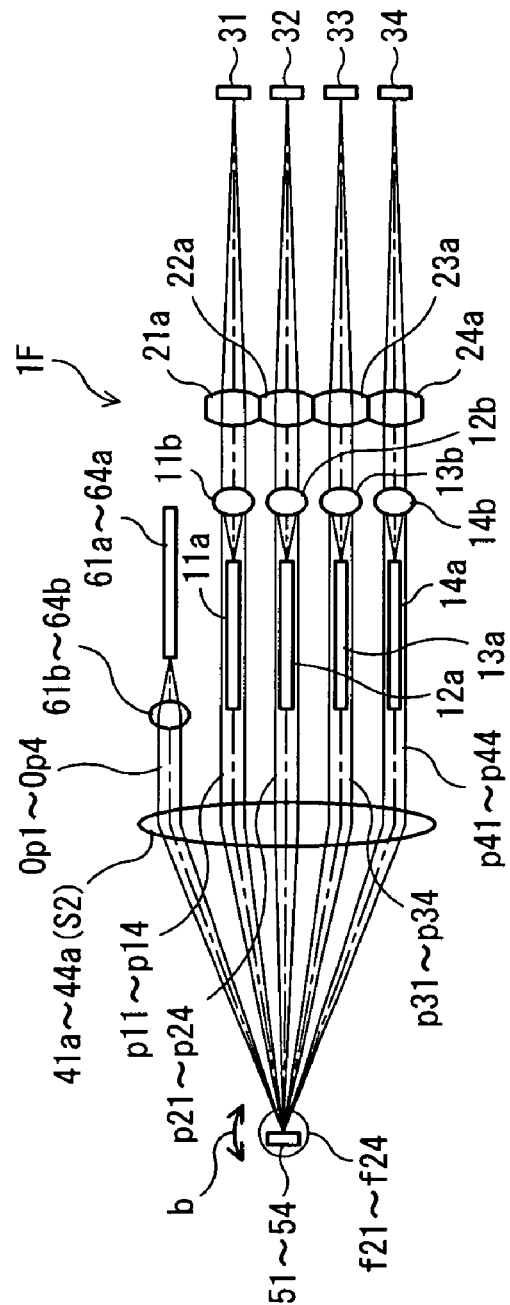
FIG. 14(a)
FIG. 14(b)

US 7,289,695 B2

OPTICAL SWITCHING DEVICE AND OPTICAL MEMBER UNIT

BACKGROUND OF THE INVENTION

1) Field of the Invention

The present invention relates to an optical switching device and an optical member unit and, more particularly, to an optical switching device and an optical member unit suitably applicable to the case of switching over a destination for connection between each of optical fibers and the other such as the case of selecting an optical communication channel or the case where each of information devices connected with optical fibers switches over its companion for connection.

2) Description of the Related Art

Conventional M×N (M and N are integers greater than 1) optical switching devices include, for example, one described in the following Patent document 1. As shown in FIG. 16, Patent document 1 describes an optical switching device including incoming side optical fibers Fa1 to Fa4, outgoing side optical fibers Fb1 to Fb4, lenses La1 to La4 and Lb1 to Lb4, and mirrors M11 to M44 and a technique to switch over the connection between each of the incoming side optical fibers Fa1 to Fa4 and each of the outgoing side optical fibers Fb1 to Fb4 by the setting of the mirrors M11 to M44 for reflecting light beams.

However, in the configuration shown in FIG. 16, the distances between each of the incoming side optical fibers Fa1 to Fa4 and each of the outgoing side optical fibers Fb1 to Fb4 via the mirrors M11 to M44 are different from each another, and if an attempt is made to minimize the connection loss for a certain distance, the loss is increased for other distances and a dispersion of loss becomes great as the entire optical switching device.

In contrast to this, the technique described in Patent document 1 described above tries to solve the above-mentioned problem by employing a configuration as shown in FIG. 17. In the configuration shown in FIG. 17, 1×N optical switches sa1 to sa4 are connected to the incoming side optical fibers Fa1 to Fa4 respectively and, M×1 optical switches sb1 to sb4 are connected to the outgoing side optical fibers Fb1 to Fb4 respectively, each of the incoming side optical switches sa1 to sa4 is connected to the outgoing side optical switches sb1 to sb4 with optical fibers ff11 to ff44 respectively, and the distance traveled by light beams propagating in space is shortened by connecting the optical switches sa1 to sa4 and the optical switches sb1 to sb4 with the optical fibers ff11 to ff44, and thus an attempt is made to reduce the connection loss.

In Patent documents 2 to 5 described below also, an attempt is made to reduce a dispersion of loss as the entire optical switching device as described above.

In other words, as shown in FIG. 18, in an optical switch 100 described in Patent document 2, optical fibers 101 and 102 with converging optical transmission body 107 and 108 attached to the respective front ends thereof are arranged in such a manner that respective optical center axes 106 form a grid-like shape on the same plane and even when the optical fibers are switched over by a reflector 105, the distance between the optical fibers 101 and 102 with the convergent optical transmission media 107 and 108 attached to the respective front ends thereof is kept constant. Due to this, all of the optical path lengths between the end face of arbitrary one of the optically connectable optical fibers 101 and the end face of arbitrary one of the optically connectable optical fibers 102 are made equal to each another and thus the loss is kept constant.

Patent document 3 describes a 2-input & 2-output (2×2) optical switch 110 according to another conventional technique that makes the distance between each of incoming side optical fibers and each of outgoing side optical fibers constant as shown in FIG. 19. In the optical switch 110 shown in FIG. 19, reference numeral 111 denotes a flat substrate. Reference numeral 112 denotes four movable reflecting mirrors attached to the substrate 111 rotatably about a rotation axis 113 and the rotation axes 113 are arranged on the surfaces of the respective movable reflecting mirrors 112 so that the height thereof is the same, and the respective movable reflecting mirrors 112 are arranged so that the respective centers thereof are at respective vertexes of a rectangle.

In the optical switch 110, the paths of incident light beams 115 after reflection are switched over by changing the angle of the movable reflecting mirror 112 which the incident light beams 115 enter first and by which are reflected. In other words, when the movable reflecting mirror 112 is in a state of being rotated with respect to the substrate 111, the light beams 115 travels along an intersecting optical path 116 shown by a solid line and when in a state of being parallel to the substrate 111, the light beam 115 travels along a rectilinear optical path 117 shown by a broken line. When traveling along the intersecting optical path 116, the light beams 115 are reflected by an intersecting optical path reflecting mirror 114a arranged in parallel to the substrate 111 on the way, and are outputted as outgoing light beams. When traveling along the rectilinear optical path 117, the light beams 115 are reflected by a rectilinear optical path reflecting mirror 114b arranged in parallel to the substrate 111 on the way, and are outputted as outgoing light beams.

At this time, the optical path length of the intersecting optical path 116 and that of the rectilinear optical path 117 can be made equal by making a height hc of the intersecting optical path reflecting mirror 114a from the substrate 111 less than a height hb of the rectilinear optical path reflecting mirror 114b from the substrate 111. Due to this, the loss is kept constant regardless of the switching state.

In a 4×4 optical switch described in Patent document 4, the distance between each of incoming side optical fibers 126 and each of outgoing side optical fibers 127 is kept constant by employing such a configuration as shown in FIG. 20. The optical switch 120 has a substrate 121 having integrally 16 switch cells 125 formed of a MEMS, mirrors 122 and 123 perpendicular to a main surface 121A of the substrate 121 and in parallel to each other, and an optical unit 124 for providing input optical path P1 for input channels (input ports) #1 to #4 and an output optical path P2 for output channels (output ports) #1 to #4.

In this configuration, the switch cell 125 includes a switch mirror 128 provided movably with respect to the substrate 121, and switching over a first state in which the switch mirror 128 is parallel to the main surface 121A and a second state in which the switch mirror 128 is perpendicular to the main surface 121A allows the states of optical connection between each of the incoming side optical fibers 126 and each of the outgoing side optical fibers 127 to be switched over with an optical path formed by the collaboration of the mirrors 122 and 123. In this case, even when any one of the optical paths is formed, the distance between the optical fibers 126 and 127 can be made equal to, for example, the rectilinear distance between the optical fiber 126 at the input channel #4 and the optical fiber 127 at the output channel #1.

In other words, by keeping the optical path length constant independent of the switching path, a loss fluctuation depending on the path is suppressed.

Moreover, in an optical switch 130 described in Patent document 5, as shown in FIG. 21, a first optical waveguide array 131 having n optical waveguides (#1, #2, . . . , #n) arranged so that the ends thereof are in an alignment and a second optical waveguide array 132 having m optical waveguides (#1, #2, . . . , #m) arranged so that the ends thereof are in an alignment are connected via an optical switch element 135 having n×m optical switches 135S arranged in a matrix on a substrate plane, light connecting optical elements 133 and 134, and first and second cata-dioptric elements 136 and 137, and the optical paths between the end of the i-th (i=1 to n) optical waveguide in the first optical waveguide array 131 and the end of the j-th (j=1 to m) optical waveguide in the second optical waveguide array 132 can be switched over arbitrarily.

In the optical switch 130, the first and second cata-dioptric elements 136 and 137 are arranged so that the optical path length between arbitrary one of the first optical waveguide array 131 and arbitrary one of the second optical waveguide array 132 is kept to a fixed length L0 (for example, the total of L1 to L4 in FIG. 21, which is the optical path length between the #n optical fiber constituting the first optical waveguide array 131 and the #m optical fiber constituting the second optical waveguide array 132) by deflecting the optical path between each of the first and second optical waveguide arrays 131 and 132 and the optical switch element 135, and thus a loss fluctuation depending on the path is suppressed.

[Patent document 1] Japanese Patent Laid-Open (Kokai) S54-038147

[Patent document 2] Japanese Patent Laid-Open (Kokai) S55-022723

[Patent document 3] Japanese Patent Laid-Open (Kokai) 2001-356283

[Patent document 4] Japanese Patent Laid-Open (Kokai) 2002-258177

[Patent document 5] Japanese Patent Laid-Open (Kokai) 2003-241239

However, the above-mentioned optical switches according to the conventional techniques described in Patent documents 1 to 5 have the following problems.

In the case of the optical switch described in Patent document 1 and shown in FIG. 17, the optical switches sa1 to sa4 and the optical switches sb1 to sb4 are connected with the optical fibers ff11 to ff44, therefore, there arises a problem in that the size is increased because the fibers need to be led circuitously, not linearly. Moreover, in order to realize the optical switches sa1 to sa4 and the optical switches sb1 to sb4, the optical fibers ff11 to ff44 need to be aligned, the optical fibers Fa1 to Fa4 and Fb1 to Fb4 need to be adjusted accurately to the positions of the optical fibers ff11 to ff44, etc., therefore, a problem arises in that the manufacture thereof requires a large amount of man-hours. Still moreover, if optical connectors are used for the connection between each of the optical switches sa1 to sa4 and sb1 to sb4 and each of the optical fibers ff11 to ff44, a number of connectors are required, whereby a problem arises in that the cost of the connectors is increased, the insertion loss due to the connector connection loss is increased, etc.

In the case of the optical switches 100, 110, 120, and 130 described in Patent documents 2 to 5 described above, in order to realize an N×N optical switch, N to the second power or more movable reflection means (for example, refer to reference numeral 105 in FIG. 18) are required, therefore, a problem arises in that the size of a movable reflection means is increased, the yield of the movable reflection means is likely to be reduced, the cost thereof is increased, etc.

Moreover, anyone of a plurality of optical paths formed by optical members interposed between optical fibers is made to be equal in length to the longest optical path.

At this time, the longer the optical path is, the greater the beam diameter needs to be, therefore, it is necessary to increase the diameter of an optical condensing means for condensing light beams outputted from optical fibers, and as a result, a problem arises in that the input/output fiber pitch is increased and the device is increased in size.

Still moreover, in the case of the optical switches 100 and 120 disclosed in Patent documents 2 and 4, the front ends of the respective fibers 101, 102, 126, and 127 need to be arranged obliquely, therefore, it is difficult to simultaneously manufacture optical fibers together in an array form. Because of this, the optical fibers need to be positioned and fixed one by one to assemble an optical switch and therefore a problem arises in that assembly requires a large amount of man-hours.

On the other hand, in the case of the optical switch 110 described in Patent document 3, it is necessary to make the height hc of the intersecting optical path reflecting mirror 114a from the substrate 111 differ from the height hb of the rectilinear optical path reflecting mirror 114b from the substrate 111, therefore, a special technique is required for the manufacture of the reflecting mirrors 114a and 114b and as a result, a problem arises in that the cost of the mirror is increased. Moreover, when an optical switch having a large number of inputs and outputs is configured, if the number of inputs and outputs is assumed to be N, substantially N×3 times of mirror reflection are required and as a result, a problem arises in that the yield is decreased, the cost of the mirror is increased, and the loss due to reflection is increased.

SUMMARY OF THE INVENTION

The above-problems being taken into account, the present invention has been developed and an object thereof is to provide the simple optical switch that takes the optical path length into consideration and another object thereof is to reduce the number of members such as a movable mirror for reflecting light beams to a relatively small number.

Another object is to reduce the number of man-hours required for the manufacture.

Yet another object is to reduce the device in size by reducing the distance between optical condensing means such as a lens or between input and output ports to a relatively short one.

Therefore, an optical switching device of the present invention comprises: an input light deflection section capable of deflecting an input light beam at a plurality of different deflection angles on a same plane, and outputting the input light beam as a light beam reflected at a selected deflection angle which selected from the a plurality of different deflection angle; a collimated light output section capable of outputting the light beam reflected at a selected deflection angle as a collimated light beam having passed any one of optical axes in a relationship of parallel translation to each other in accordance with the selected deflection angle; and an output direction-path guide section for guiding the collimated light beam from the collimated light output section to the output direction-path in accordance with the optical axis.

Moreover, the collimated light output section is constituted of a member having a paraboloid-type reflection surface and the input light deflection section is provided at the position of the substantially focal point of the paraboloid.

Furthermore, the collimated light output section is constituted of a convex lens and the input light deflection section is provided at the position of the substantially focal point of the convex lens.

And, an optical switching device of the present invention comprises an optical condenser capable of condensing light beams to a substantially specific position even when any one of a plurality of collimated light beams parallel to each another on the same plane is inputted; and an output light deflection section for guiding the condensed light beams from the optical condenser to a single output direction-path by deflecting the condensed light beams.

Furthermore, the optical condenser is constituted of a member having a paraboloid-type reflection surface and configured so as to condense the plurality of collimated light beams at the position of the substantially focal point of the paraboloid, and the output light deflection section is provided at the position of the substantially focal point of the paraboloid.

Moreover, the optical condenser is constituted of a convex lens and configured so as to condense the plurality of collimated light beams at the position of the substantially focal point, and the output light deflection section is provided at the position of the substantially focal point of the convex lens.

And, an optical switching device of the present invention comprises: a first member for forming a sub-unit including a plurality of collimated light output section; a second member for forming a sub-unit including a plurality of optical condenser; a plurality of input light deflection section disposed so as that one of the collimated light output section and one of the input light deflection section make a pair; and a plurality of output light deflection section disposed on the second member so as that one of the optical condenser and one of the output light deflection section make a pair: wherein the a plurality of collimated light output section are disposed so that the a plurality of collimated light output section are piled up and form the a first member; the a plurality of optical condenser are disposed so that the a plurality of optical condenser are piled up and form the a second member; the input light deflection section is capable of deflecting an input light beam from the input port at a plurality of different deflection angle on a plane parallel to the plane corresponding to a boundary plane dividing each of the collimated light output section, and outputting the input light beam as a light beam reflected at a selected deflection angle which selected from the a plurality of different deflection angle; the collimated light output section is capable of outputting the light beam reflected by the input light deflection section as a collimated light beam having passed any one of optical axes in a relationship of parallel translation to each other in accordance with the selected deflection angle; the optical condenser is capable of condensing a plurality of collimated light beam from the collimated light output section to a substantially specific position; and the output light deflection section capable selectively guiding one of the condensed light beam from the optical condenser to a single output port by deflecting the condensed light beam on a plane parallel to the plane corresponding to a boundary plane dividing each of the optical condenser.

Furthermore, the collimated light output section is constituted of a member having a first paraboloid-type reflection surface and the first parabolid-type reflection surface and other members are arranged so as to condense the input light beam to a substantially focal point of the paraboloid, and the input light deflection section is provided at the position of the substantially focal point of the first paraboloid.

Moreover, the optical condenser is constituted of a member having a second paraboloid-type reflection surface formed on the second member and configured so as to condense the plurality of collimated light beams at the position of the substantially focal point of the second paraboloid, and the output light deflection section is provided at the position of the substantially focal point of the second paraboloid.

Still furthermore, the first member and the second member are formed integrally together with a single transparent block.

Still additionally, the collimated light output section is constituted of a first member having a function of a convex lens, and the first member having a function of a convex lens and other members are arranged so as to condense the input light beam to a substantially focal point of the first member having a function of a convex lens, and the input light deflection section is provided at the position of the substantially focal point of the first member having a function of a convex lens.

Yet moreover, the optical condenser is constituted of a second member having a function of a convex lens and configured so as to condense the plurality of collimated light beams at the position of the substantially focal point of the second member having a function of a convex lens.

And, an optical switching device of the present invention comprises: a transparent block on which a plurality of paraboloid-shaped first reflection surface plane and a plurality of paraboloid-shaped second reflection surface plane are formed in opposition to each other, both the first reflection surface plane and the second reflection surface plane in the shape of a peace of paraboloid with stripe shaped outline, and being configured so that the plurality of first reflection surface plane are arranged in parallel each other and also the plurality of second reflection surface plane are arranged in parallel each other, and furthermore the first reflection surface plane and the second reflection surface plane are disposed so as that stripe shaped patterns on the first reflection surface plane and the second reflection surface plane are substantially perpendicular to each other; an input light deflection member capable of outputting a light beam inputted from an input port as a deflected light beam toward the first reflection surface plane at different angles on a plane parallel to the longer side of the stripe shaped first reflection surface plane; an output light deflection member capable of deflecting the deflected light beam from the input light deflection member on a plane parallel to the longer side of the stripe shaped second reflection surface plane; and a plurality of output port; wherein the first reflection plane, the second reflection plane, the input light deflection member, the output light deflection member and the output port are arranged so that the input light beam being reflected sequentially by the input deflection member and the first reflection surface plane and the second reflection surface plane and the output deflection member, and guiding the light beam to the output port in accordance with deflection angles of light beam deflected by the input deflection member and the output deflection member.

And, an optical member unit of the present invention comprises: a transparent block having a paraboloid-shaped reflection surface plane; a light deflection member having a tiltable reflection plane capable of varying tilt angle of the tiltable reflection plane and controlling a output direction of a light beam reflected by the tiltable reflection plane so that the reflected light beam expose an appointed portion on the paraboloid-shaped reflection surface plane formed on the transparent block; and an optical fiber optically connected to the paraboloid-shaped reflection surface plane via the light deflection member.

Moreover, the paraboloid-shaped reflection surface plane, the light deflection member and the optical fiber are provided in plural and in parallel and with same pitch, and the light deflection member and center axis of the optical fiber are disposed on a same plane being substantially perpendicular to the paraboloid-shaped reflection surface plane.

And also, an optical member unit, comprises: a first optical member sub-unit, comprising; a first transparent block on which a first paraboloid-shaped reflection surface plane having a stripe shape outline is formed, a first light deflection member having a tiltable reflection plane capable of varying tilt angle of the tiltable reflection plane and controlling a output direction of a light beam reflected by the tiltable reflection plane so that the reflected light beam expose an appointed portion on the first paraboloid-shaped reflection surface plane which formed on the first transparent block, and a first optical fiber optically connected to the first paraboloid-shaped reflection surface plane via the first light deflection member; and a second optical member sub-unit, comprising; a second transparent block on which a second paraboloid-shaped reflection surface plane having a stripe shape outline is formed, a second light deflection member having a tiltable reflection plane capable of varying tilt angle of the tiltable reflection plane and controlling a output direction of a light beam reflected by the tiltable reflection plane so that the reflected light beam expose an appointed portion on the second paraboloid-shaped reflection surface plane which formed on the second transparent block, and a second optical fiber optically connected to the second paraboloid-shaped reflection surface plane via the first light deflection member; wherein the first optical member sub-unit and the second optical member sub-unit are disposed in opposition to each other so as that the stripe shaped patterns of the first paraboloid-shaped reflection surface plane and the second paraboloid-shaped reflection surface plane are substantially perpendicular each other, and a light beam reflected by the first deflection member arrive at the first deflection member via both the first paraboloid-shaped reflection surface plane and the second paraboloid-shaped reflection surface plane.

And, an optical switching device of the present invention comprises: a plurality of input ports including first and second input ports forming a first row; a plurality of output ports including first and second output ports forming a second row; first and second reflection sections forming a third row; and third and fourth reflection sections forming a fourth row in a positional relationship in which the first row and the third row are parallel, the second row and the fourth row are parallel, and the plane the normal of which is the first row and the plane the normal of which is the second row intersect perpendicularly, wherein: the first reflection section is capable of controlling the reflection surface to guide a first input light beam inputted from the first input port to the third reflection section; the second reflection section is capable of controlling the reflection surface to guide a second input light beam inputted from the second input port to the third reflection section; the third reflection section is capable of controlling the reflection surface to guide both of the first input light beam and the second input light beam having different incident angles to the first output port; and the fourth reflection section is capable of controlling the reflection surface to guide both of the first input light beam and the second input light beam having different incident angles to the second output port.

As described above, according to the present invention, it is possible to provide a simple optical switch that takes the optical path length into consideration.

Further, according to the present invention, it is possible to reduce the number of members such as a movable mirror for reflecting light beams to a relatively small number.

Further, according to the present invention, it is possible to reduce the number of man-hours required for manufacture.

Still further, according to the present invention, it is possible to reduce the device in size by reducing the distance between optical converging means such as a lens or between input/output ports to a relatively short distance.

BRIEF DESCRIPTION OF THE DRAWINGS

FIG. 1 is a perspective view showing an optical switching device according to a first present embodiment of the present invention.

FIG. 14(a) and FIG. 14(b) are diagrams showing an optical switching device according to a second embodiment.

DESCRIPTION OF THE PREFERRED EMBODIMENTS

The embodiments of the present invention are explained below with reference to drawings.

In addition to the above-mentioned objects of the present invention, other technical problems and means to solve the technical problems and its operational effect will be cleared in the description of the embodiments disclosed below.

[A1] Description of First Embodiment

[A1-1] Configuration

Figure 2A:
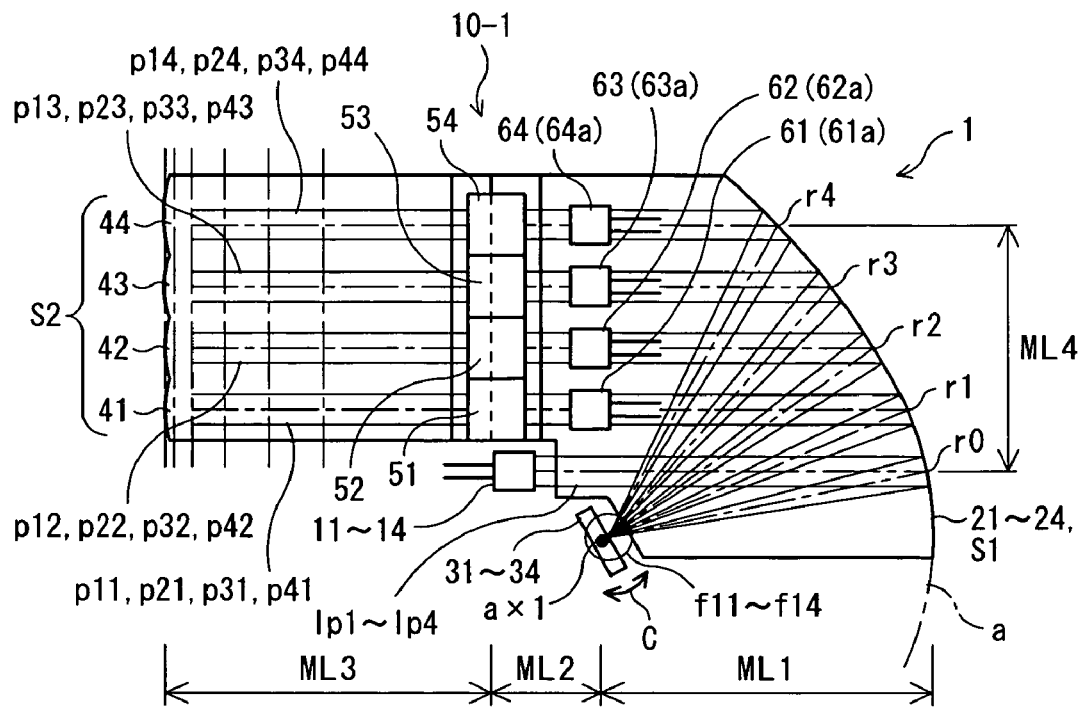
FIG. 2(a) is a diagram showing the optical switch according to the first embodiment when viewed in the direction of arrow A in FIG. 1.
Figure 2B:
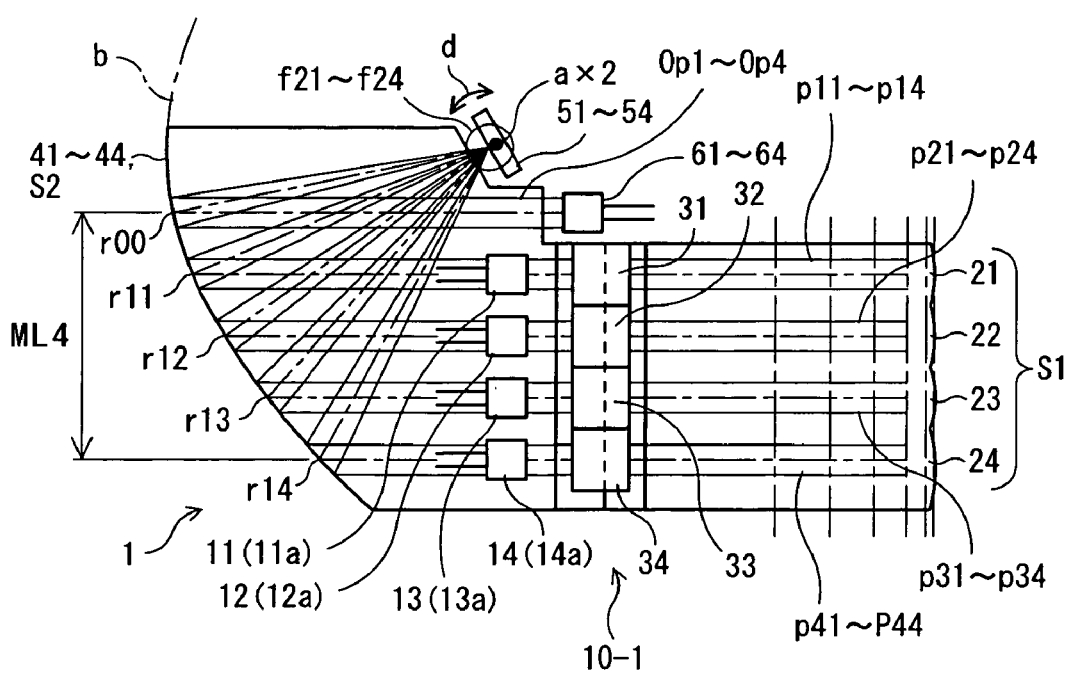
FIG. 2(b) is a diagram showing the optical switch according to the first embodiment when viewed in the direction of arrow B in FIG. 1.

FIG. 1 is a perspective view showing an optical switching device 1 according to a first embodiment of the present invention, FIG. 2(a) is a diagram showing the optical switch 1 according to the first embodiment when viewed in the direction of arrow A in FIG. 1, and FIG. 2(b) is a diagram showing the optical switch 1 according to the first embodiment when viewed in the direction of arrow B in FIG. 1. The optical switching device 1 shown in FIG. 1 includes a transparent block 10-1 constituted of glass, plastic, etc. and has a configuration in which optical fibers 11a to 14a and optical fibers 61a to 64a are connected to the transparent block 10-1 via first ports 11 to 14 and second ports 61 to 64, respectively, and further, movable reflection members 31 to 34 and 51 to 54 are fixed on the transparent block 10-1.

Here, the first ports 11 to 14 and the second ports 61 to 64 are configured so that a converging optical transmission medium, not shown, is arranged, for example, at the front end of each of the optical fibers 11a to 14a and 61a to 64a which is an object of connection, light beams outputted from the optical fibers 11a to 14a and 61a to 64a are converted into substantially parallel light beams and conversely, and when substantially parallel light beams enter from the outside, the substantially parallel light beams are condensed and connected to the optical fibers 11a to 14a and 61a to 64a.

As a converging optical transmission medium, for example, a cylindrical lens having a distribution in which the refractive index of the medium decreases substantially in proportion to the square of the distance from the optical center axis in a plane perpendicular to the transmission direction of light beams can be used. At this time, the length of the cylindrical lens is set to one fourth of the natural period length thereof and is arranged so that the focal point is located on the end face thereof.

Additionally, the parts of the transparent block 10-1 to which the above-mentioned optical fibers 11a to 14a and 61a to 64a are connected are formed appropriately into a shape that supports the optical connection between each of the optical fibers 11a to 14a and 61a to 64a and the transparent block 10-1, in addition to each connection and fixed state, and similarly, the parts on which the movable reflection members 31 to 34 and 51 to 54 are fixed are formed appropriately into a shape that supports the function of the movable reflection members 31 to 34 and 51 to 54 as described below.

The transparent block 10-1 has a first reflection surface S1 and a second reflection surface S2 in opposition to each other, both in the shape of a paraboloid, and both are configured so that the plane including the loci of parabolas constituting the shape of the paraboloid of the first reflection surface S1 of the transparent block 10-1 and that of the second reflection surface S2 are substantially perpendicular to each other.

Specifically, the first reflection surface S1 has a surface similar to that obtained by slicing a surface, which is formed when a graph expressed by $y=ax^2$ is rotated about the y-axis, bilateral-symmetrically with respect to the y-axis. Therefore, as shown in FIG. 2(a), surfaces 21, 22, 23, and 24 constituting the surface S1 have the contour of a locus of parabola a included in a plane substantially perpendicular to a direction A when viewed from the direction A (the direction in which the top surface is viewed from a point directly opposite thereto) in FIG. 1. Similarly, as shown in FIG. 2(b), the surfaces 21, 22, 23, and 24 have the contour of a locus of parabola included in a plane substantially perpendicular to a direction B when viewed from the direction B (the direction in which the side surface is viewed from a point directly opposite thereto) in FIG. 1. Similarly, the second reflection surface S2 has a surface similar to that obtained by slicing a surface, which is formed when a graph expressed by $y=ax^2$ is rotated about the y-axis, bilateral-symmetrically with respect to the y-axis. Therefore, as shown in FIG. 2(b), surfaces 41, 42, 43, and 44 constituting the surface S2 have the contour of a locus of parabola b included in a plane substantially perpendicular to a direction B when viewed from the direction B (the direction in which the side surface is viewed from a point directly opposite thereto) in FIG. 1. Similarly, as shown in FIG. 2(a), the surfaces 41, 42, 43, and 44 have the contour of a locus of parabola included in a plane substantially perpendicular to a direction A when viewed from the direction A (the direction in which the top surface is viewed from a point directly opposite thereto) in FIG. 1. At this time, since the direction A and the direction B are substantially perpendicular to each other, the plane including the locus of parabola a and the plane including the parabola b are substantially perpendicular to each other. Preferably, the graphs of $y=ax^2$, as the loci of parabolas forming the contours of the first reflection surface S1 and the second reflection surface S2 described above, substantially have the same gradient a.

Further, on the position of the substantially focal point of the paraboloid constituting the first reflection surface S1 described above in the transparent block 10-1, the plural (four in FIG. 1) movable reflection members 31 to 34 are fixed in the direction of height of the transparent block 10-1. Reference symbols f11 to f14 in FIG. 1 denote the positions, being the substantially focal points, on which the movable reflection members 31 to 34 are fixed. Then, as shown in FIG. 2(a), the movable reflection members 31 to 34 are configured so that the reflection surface can rotate in the direction c shown in the figure about a rotation axis ax1 (direction perpendicular to the plane of the paper) in the direction perpendicular to a plane including the locus of parabola a (in the direction of height of the transparent block 10-1 in FIG. 1) and, for example, each may be constituted of a MEMS (Micro Electro Mechanical System) mirror.

Moreover, the optical fibers 11a to 14a described above are connected so that the end faces are aligned in the direction perpendicular to a plane including the locus of parabola a [refer to FIG. 2(a)] and light beams Ip1 to Ip4 (light beams to be inputted to the optical switching device 1) to be outputted from the optical fibers 11a to 14a, respectively, are reflected by the first reflection surface S1 and made to enter the movable reflection members 31 to 34 arranged at the corresponding positions.

Moreover, the movable reflection members 31 to 34 are configured so as to be capable of reflecting the light beams from the optical fibers 11a to 14a at a reflection angle set toward the first reflection surface S1 by the inclination angle of the reflection surface of the movable reflection members 31 to 34 described above. That is, the movable reflection members 31 to 34 are configured so as to be capable of diffusing the light beams inputted from the optical fibers 11a to 14a.

In other words, the movable reflection members 31 to 34 can function as an input light deflection section (or an input light deflection member) capable of outputting an input light beam as a deflected light beam the angle of which is set on the same plane (plane including the locus of parabola a).

Moreover, the deflected light beam the reflection angle of which is set by the movable reflection members 31 to 34 described above is made to enter the paraboloid constituting the first reflection surface S1, and the incident position on the paraboloid is made to be in accordance with the inclination angle of the reflection surface set by the movable reflection members 31 to 34. For example, when the inclination angle of the movable reflection members 31 to 34 is set so that the incident angle of an input light beam (angle between a straight line perpendicular to the reflection surface and the optical axis of the incident light beam) is large, the incident position of the deflected light beam on the reflection surface S1 becomes more distant from a position (r0) at which the light beam from the optical fibers 11a to 14a is reflected by the first reflection surface S1 (becomes nearer to the side of r4), and when the inclination angle of the movable reflection members 31 to 34 is set so that the incident angle of the input light beam is small, the incident position of the deflected light beam on the reflection surface S1 becomes nearer to the position (r0) at which the light beam from the optical fibers 11a to 14a is reflected by the first reflection surface S1 (becomes nearer to the side of r1).

Moreover, the deflected light beam from the abovementioned movable reflection members 31 to 34 is reflected by the reflection surface S1 as a collimated light beam toward the second reflection surface S2 in opposition thereto. At this time, depending on the incident position of the deflected light beam to the movable reflection members 31 to 34, the optical axis of the reflected collimated light beam is shifted parallelly (in this case, in parallel to the direction of width of the transparent block 10-1). In other words, it is possible to parallelly translate the optical axis of the collimated light beam toward the second reflection surface S2 in accordance with the setting of the inclination angle of the movable reflection members 31 to 34.

Since the movable reflection members 31 to 34 can individually set the inclination angle, it is possible to individually set the distance between optical axes of the collimated light beams toward the reflection surface S2 by individually setting the inclination angle of the movable reflection members 31 to 34 for each of the light beams Ip1 to Ip4 from the optical fibers 11a to 14a. In FIG. 1, the parts of the first reflection surface S1, at which each of the light beams Ip1 to Ip4 from the optical fibers 11a to 14a is reflected toward the movable reflection members 31 to 34 and at the same time, the collimated light beam toward the reflection surface S2 is reflected, are shown as collimated light output sections 21 to 24, respectively.

In other words, each of the movable reflection members 31 to 34 is a light deflection member having a tiltable reflection plane capable of varying tilt angle of said tiltable reflection plane and controlling a output direction of a light beam reflected by said tiltable reflection plane so that said reflected light beam expose an appointed portion on said paraboloid-shaped reflection surface plane formed on the transparent block 10-1.

If the light beam Ip1 from the optical fiber 11a is taken as an example, the light beam Ip1 is reflected by the collimated light output section 21 constituting the first reflection surface S1 toward the movable reflection member 31. Then, by reflecting the light beam Ip1 inputted as a reflected light beam from the collimated light output section 21, the movable reflection member 31 outputs a deflected light beam with a set angle (that is, a direction of propagation) toward the paraboloid constituting the collimated light output section 21 in accordance with the setting of the inclination angle of the reflection surface.

The collimated light output section 21 reflects the deflected light beams from the movable reflection member 31 at different positions in accordance with the angle of the deflected light beam and outputs them as collimated light beams p11 to p14 toward the second reflection surface S2. For example, as shown in FIG. 2(*a*) [or in FIG. 2(*b*)], when the deflected light beam enters the position r1 relatively near to the position r0 at which the light beam Ip1 from the optical fiber 11a is reflected, the collimated light beam p11 having the optical axis passing the position r1 is outputted as a reflected light beam, and when the deflected light beam enters the positions r2 to r4, more distant from the position r0 in this order, the respective collimated light beams p12 to p14 having the respective optical axes passing the respective positions r2 to r4 are outputted as a reflected light beam.

As for the light beams Ip2 to Ip4 from the optical fibers 12a to 14a also, similarly to the case of the light beam Ip1 described above, the collimated light output sections 22 to 24 reflect the deflected light beams from the movable reflection members 32 to 34 at different positions in accordance with the respective angles of the deflected light beams and output them as collimated light beams p21 to p24, p31 to p34, and p41 to p44 toward the reflection surface S2.

Therefore, the respective collimated light output sections 21 to 24 can output the input deflected light beams from the movable reflection members 31 to 34 functioning as an input light deflection section as a collimated light beam having passed any one of the parallel optical axes in accordance with the set angle, and it can be said that the four collimated light output sections 21 to 24 are stacked as a single unit in the direction of height of the transparent block 10-1.

The optical fibers 61a to 64a are connected so that the end faces thereof are arranged in the direction perpendicular to a plane including the locus of parabola b and the optical fibers 61a to 64a are each optically connected to the collimated light beams reflected by the first reflection surface S1 via the respective movable reflection members 51 to 54 and the second reflection surface S2 as described below. At this time, the second reflection surface S2 and the movable reflection members 51 to 54 have opposite functions to those of the first reflection surface S1 and the movable reflection members 31 to 34 described above.

In other words, by reflecting the collimated light beams p11 to p14, p21 to p24, p31 to p34, and p41 to p44 from the first reflection surface S1 by the second reflection surface S2, it is possible to condense (make converge) collimated light beams at a specific position per the collimated light beams parallelly translated at the inclination angle of the movable reflection members 31 to 34 functioning as an input light deflection section and having substantially the same position of the optical axis. In FIG. 1, the parts of the second reflection surface S2, at which the collimated light beams from the first reflection surface S1 are reflected toward the movable reflection members 51 to 54 and the condensed light beams are outputted toward the respective movable reflection members 51 to 54, are shown as optical condensers 41 to 44.

For example, as shown in FIG. 2(*a*), the collimated light beams p11, p21, p31, and p41 substantially have the same optical axis in the direction of width of the transparent block 10-1 and the optical condenser 41 constituting the second reflection surface S2 can condense the collimated light beams at the position of the substantially focal point (specific position) of the paraboloid constituting the second reflection surface S2. In other words, the collimated light beams p11, p21, p31, and p41 enter positions r11 to r14 of the optical condenser 41 shown in FIG. 2(b) respectively and all of the positions r11 to r14 correspond to the points on the same locus of parabola b, therefore, it is possible to condense the collimate light beams at the position of the substantially focal point f21 on the above locus of parabola b.

Similarly, the optical condenser 42 condenses the collimated light beams p12, p22, p32, and p42 at the position of the substantially focal point f22 corresponding to the position of the optical axis of the collimated light beams, the optical condenser 43 condenses the collimated light beams p13, p23, p33, and p43 at the position of the substantially focal point f23 corresponding to the position of the optical axis of the collimated light beams, and the optical condenser 44 condenses the collimated light beams p14, p24, p34, and p44 at the position of the substantially focal point f24 corresponding to the position of the optical axis of the collimated light beams.

Therefore, when any one of the plural collimated light beams (in the case of the optical condenser 41, the collimated light beams p11, p21, p31, and p41) in parallel to each another on the same plane (plane perpendicular to the direction of width of the transparent block 10-1) enters, the optical condensers 41 to 44 described above can condense the light beam at the position of the substantially focal point as a specific position.

The movable reflection members 51 to 54 described above are provided at the position of the substantially focal points f21 to f24 at which the collimated light beams from the first reflection surface S1 are condensed by being reflected by the optical condensers 41 to 44 described above so as to be capable of reflecting the light beams condensed by the optical condensers 41 to 44. Moreover, the movable reflection members 51 to 54 are capable of guiding the incoming light beams from the optical condensers 41 to 44 to the optical fibers 61a to 64a through the reflection by the second reflection surface S2 at the reflection angle set according to the inclination angle.

In other words, as shown in FIG. 2(b), by setting the inclination angle of the reflection surface, the movable reflection member 51 reflects (deflects) any one of the collimated light beams p11, p21, p31, and p41 entering as a condensed light beam to a position r00 on the optical condenser 41 of the second reflection surface S2.

Due to this, the light beam incident on r00 on the optical condenser 41 is guided to the optical fiber 61 by reflection. Similarly, by setting the inclination angle of the reflection surface, the movable reflection members 52 to 54 are also capable of reflecting (deflecting) any one of the plural input collimated light beams (four, in this case) to the position r00 on the optical condensers 42 to 44 and guiding the light beams to the optical fibers 62a to 64a.

Therefore, the respective movable reflection members 51 to 54 described above constitute an output light deflection section for guiding the condensed light beams to a single output direction-path by deflecting the condensed light beams. In this case, any one of the plural light beams condensed by the optical condensers 41 to 44 is guided to the output ports 61 to 64, which is a single output direction-path, by deflecting the plural condensed light beams.

Moreover, the respective optical condensers 41 to 44 constituting the second reflection surface S2 and the respective movable reflection members 51 to 54 constitute an output direction-path guide section for guiding the collimated light beams from the collimated light output sections 21 to 24 to the output direction-path (output ports 61 to 64) corresponding to the optical axis.

The above-mentioned ports 11 to 14 are plural input ports forming a first row and any two of the first ports 11 to 14 (for example, the ports 11 and 12) are configured as first and second input ports. Then, the above-mentioned ports 61 to 64 are plural output ports forming a second row and any two of the ports 61 to 64 (for example, the ports 61 and 62) are configured as first and second output ports. Moreover, those among the movable reflection members 31 to 34 described above which reflect light from the above-mentioned first and second input ports are first and second reflection sections forming a third row. Still moreover, those among the movable reflection members 51 to 54 described above which are optically connected to the above-mentioned first and second output ports are third and fourth reflection sections forming a fourth row. Here, the positional relationship is such that the first row and the third row are parallel, the second row and the fourth row are parallel, and the plane the normal of which is the first row and the plane the normal of which is the second row intersect perpendicularly. Then, the first reflection section is capable of controlling the reflection surface to guide a first input light beam inputted from the first input port to the third reflection section, the second reflection section is capable of controlling the reflection surface to guide a second input light beam inputted from the second input port to the third reflection section, the third reflection section is capable of controlling the reflection surface to guide both of the first input light beam and the second input light beam having different incident angles to the first output port, and the fourth reflection section is capable of controlling the reflection surface to guide both of the first input light beam and the second input light beam having different incident angles to the second output port. In other words, it is possible to guide the first input light beam to the first output port or the second input light beam to the first output port by the control of switching over, for example, the angle of the reflection surface of the movable reflection member functioning as the third reflection section.

In FIG. 1, as for the part of a predetermined width on the right end of the surface 1, instead of the reflection surfaces, the input ports may be arranged longitudinally in accordance with the respective collimated light output sections 21 to 24 so that input light beam can be given directly to the movable reflection members 31 to 34. As for the part of a predetermined width on the top end of the surface S2 also, instead of the reflection surfaces, the output ports may be arranged transversely in accordance with the respective optical condensers 41 to 44 so that the light beam reflected by the movable reflection members 51 to 54 is outputted directly.

Due to this, such an effect that the number of times of reflection is reduced and the entire length of the optical path is shortened is obtained.

[A-2] Operational Effect

Due to the configuration described above, in the optical switching device 1 according to the first embodiment of the present invention, it is possible to connect the optical fibers 11a to 14a to arbitrary one of the optical fibers 61a to 64a, to which the optical fibers 11a to 14a are to be connected, both simultaneously and exclusively, based on the setting of the inclination angle of the reflection surface by the movable reflection members 31 to 34 and the movable reflection members 51 to 54.

In other words, the light beams Ip1 to Ip4 inputted from the optical fibers 11a to 14a through the first ports 11 to 14 respectively and collimated are condensed on the surface of the movable reflection members 31 to 34 at the collimated light output sections 21 to 24 constituting the first reflection surface S1. Although the condensed light beams are reflected by the movable reflection members 31 to 34, the inclination angle of the reflection angle rotates, so the inside of the paraboloid constituting the collimated light output sections 21 to 24 is scanned parallelly, therefore, the optical axis of the reflected light beam is shifted in parallel to the direction of width of the transparent block 10-1.

For example, by setting the inclination angle, the movable reflection member 31 that the condensed light beam Ip1 from the first port 11 enters makes the light beam Ip1 from the first port 11 enter the position r1 on the paraboloid constituting the collimated light output section 21 and outputs it as the collimated light beam p11 toward the second reflection surface S2. As for the light beams also, which enter the other movable reflection members 32 to 34, the inclination angle of the reflection surface is set appropriately and, for example, the collimated light beams p22, p33, and p44 are outputted at the collimated light output sections 22 to 24, respectively.

When the collimated light beams p11, p22, p33, and p44 enter the respective optical condensers 41 to 44 constituting the second reflection surface S2, the collimated light beams p11, p22, p33, and p44 reflect at the respective positions r11 to r14 on the locus of parabola b constituting the paraboloid of the optical condensers 41 to 44 and enter the movable reflection members 51 to 54 provided at the position of the substantially focal point of the locus of parabola b constituting the respective optical condensers 41 to 44.

Moreover, the movable reflection members 51 to 54 are capable of guiding the collimated light beams p11, p22, p33, and p44 reflected by the second reflection surface S2 to the optical fibers 61a to 64a via the second ports 61 to 64 by setting the angle of the reflection surface so that the collimated light beams p11, p22, p33, and p44 are reflected toward the position r00 on the paraboloid constituting the optical condensers 41 to 44. In contrast to this, in order to prevent any one the collimated light beams p11, p22, p33, and p44 from being connected to the optical fibers 61a to 64a, the angle of the reflection surface of the corresponding movable reflection members 51 to 54 needs to be set so that the reflected light beam is outputted toward a point other than the position r00.

In other words, while it is possible to select one of the optical fiber 61a to 64a, to which the light beams from the optical fiber 11a to 14a are to be outputted and guided, by switching over the optical paths of the collimated light beams based on the setting of the angle of the reflection surface of the movable reflection members 31 to 34, it is possible to select the collimated light beams that are actually guided to the optical fibers 61a to 64a per the optical fibers 61a to 64a to which the collimated light beams are to be outputted by setting the angle of the reflection surface of movable reflection members 51 to 54.

As described above, the optical switching device 1 in the first embodiment of the present invention includes the transparent block 10-1 having the first reflection surface S1 and the second reflection surface S2, and includes the movable reflection members 31 to 34 functioning as an input light deflection section and the movable reflection members 51 to 54 functioning as an output light deflection section, therefore, there is an advantage that an optical switch capable of connecting an arbitrary port of the first ports 11 to 14 as an input port and an arbitrary port of the second ports 61 to 64 as an output port both simultaneously and exclusively can be realized while the difference in connection optical path length is suppressed and at the same time, the number of the movable reflection members is reduced compared to that in the conventional technique.

In other words, according to the optical switching device 1 in the first embodiment, the number of movable reflection members required to configure an N×N optical switch (N is an arbitrary integer greater than 1) is 2×N, which is smaller than that in the cases shown in FIG. 18 to FIG. 21 described above but a sufficient number, therefore, the number of movable reflection members can be reduced. As a result, not only the device can be made more compact, but also the yield can be improved, therefore, the cost of the optical switching device can be reduced.

Moreover, in the optical switching device 1 in the first embodiment, when the optical fibers, which are to be connected, are switched over, the angles of the reflection surface of the movable reflection members 31 to 34 and 51 to 54 result in being switched over, but the relationship of connection between each of the first ports 11 to 14 and each of the second ports 61 to 64 is defined by the collaboration between the settings of angles of the reflection surface of the movable reflection members 31 to 34 and the movable reflection members 51 to 54 forming pairs, therefore, it is possible to prevent unwanted light beams from crossing other ports during the period of switching over of the angles of the reflection surface of the movable reflection members 31 to 34 and the movable reflection members 51 to 54.

Figure 17:
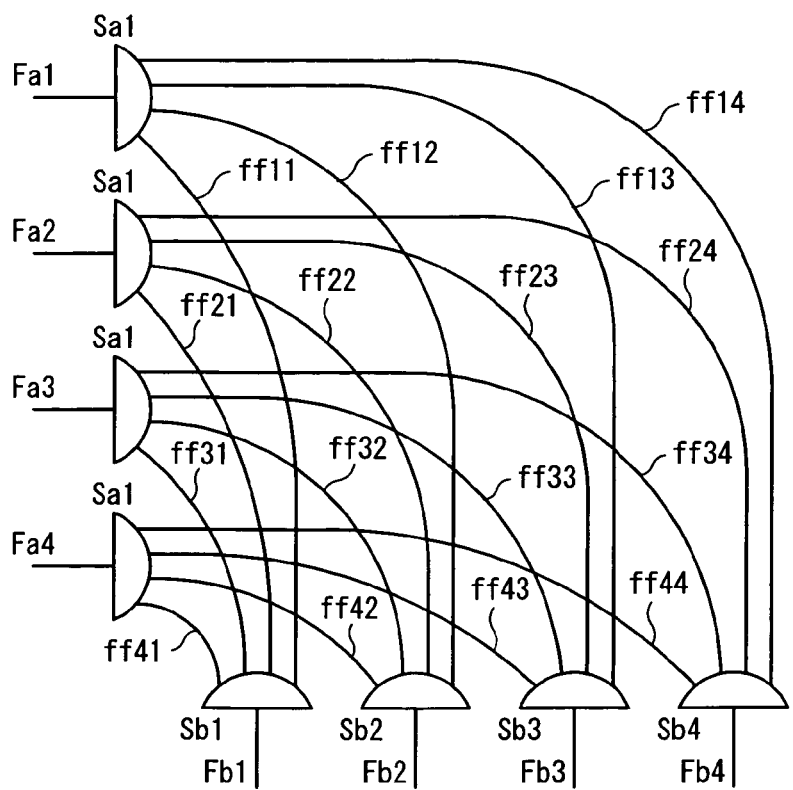

According to the optical switching device 1 in the first embodiment, it is possible to realize a multi-input×multi-output (in the first embodiment, 4-input×4-output) optical switch that does not require connection with optical fibers within the switch as shown in FIG. 17.

Figure 18:
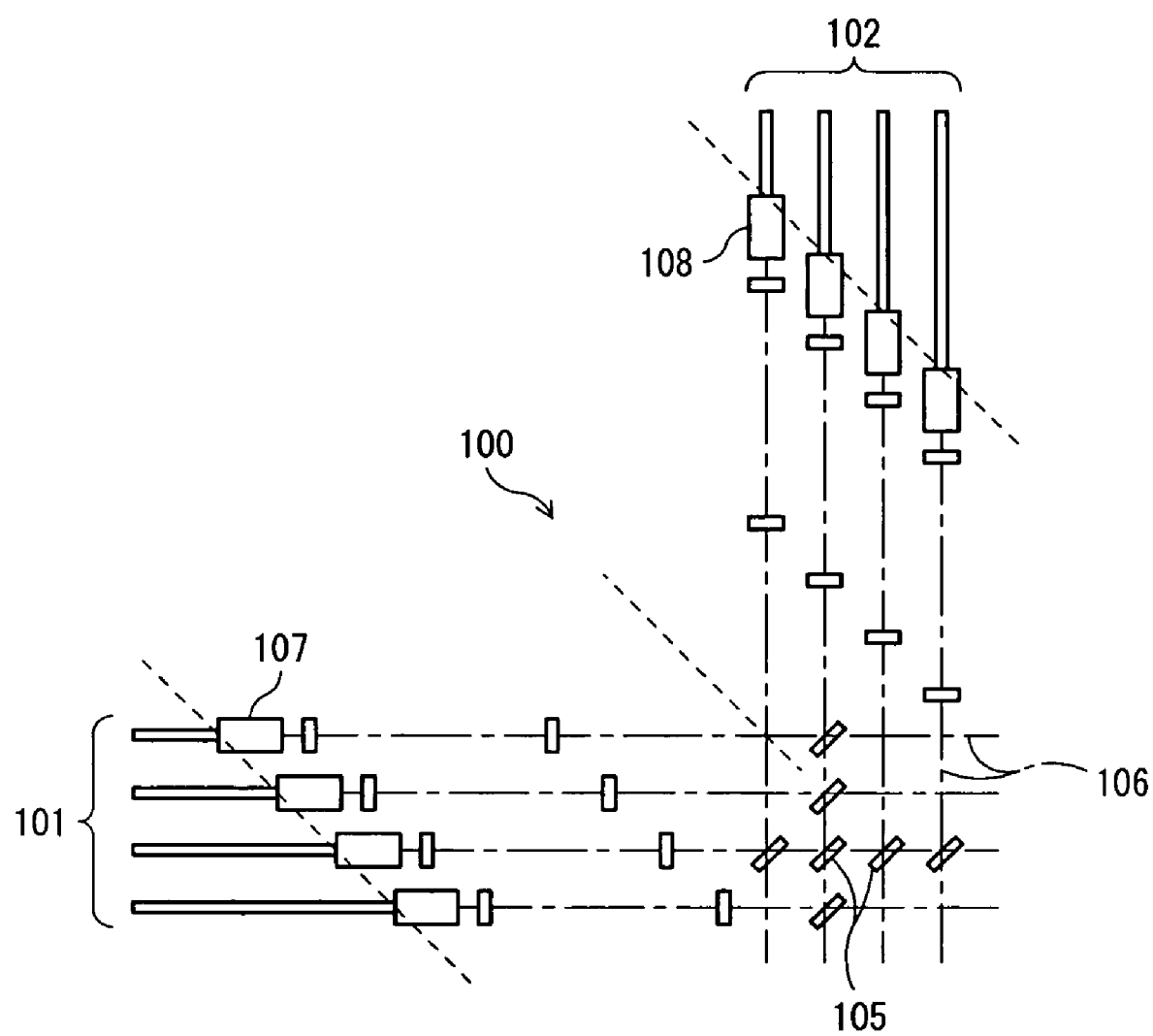
Figure 20:
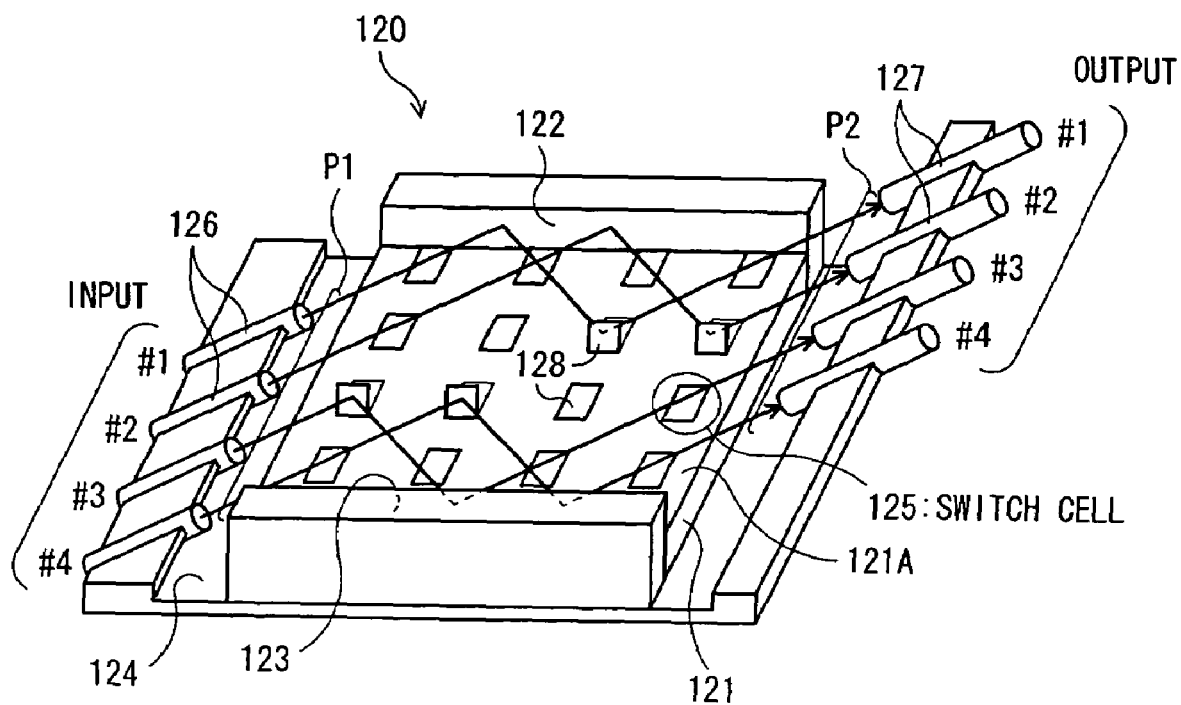
Figure 21:
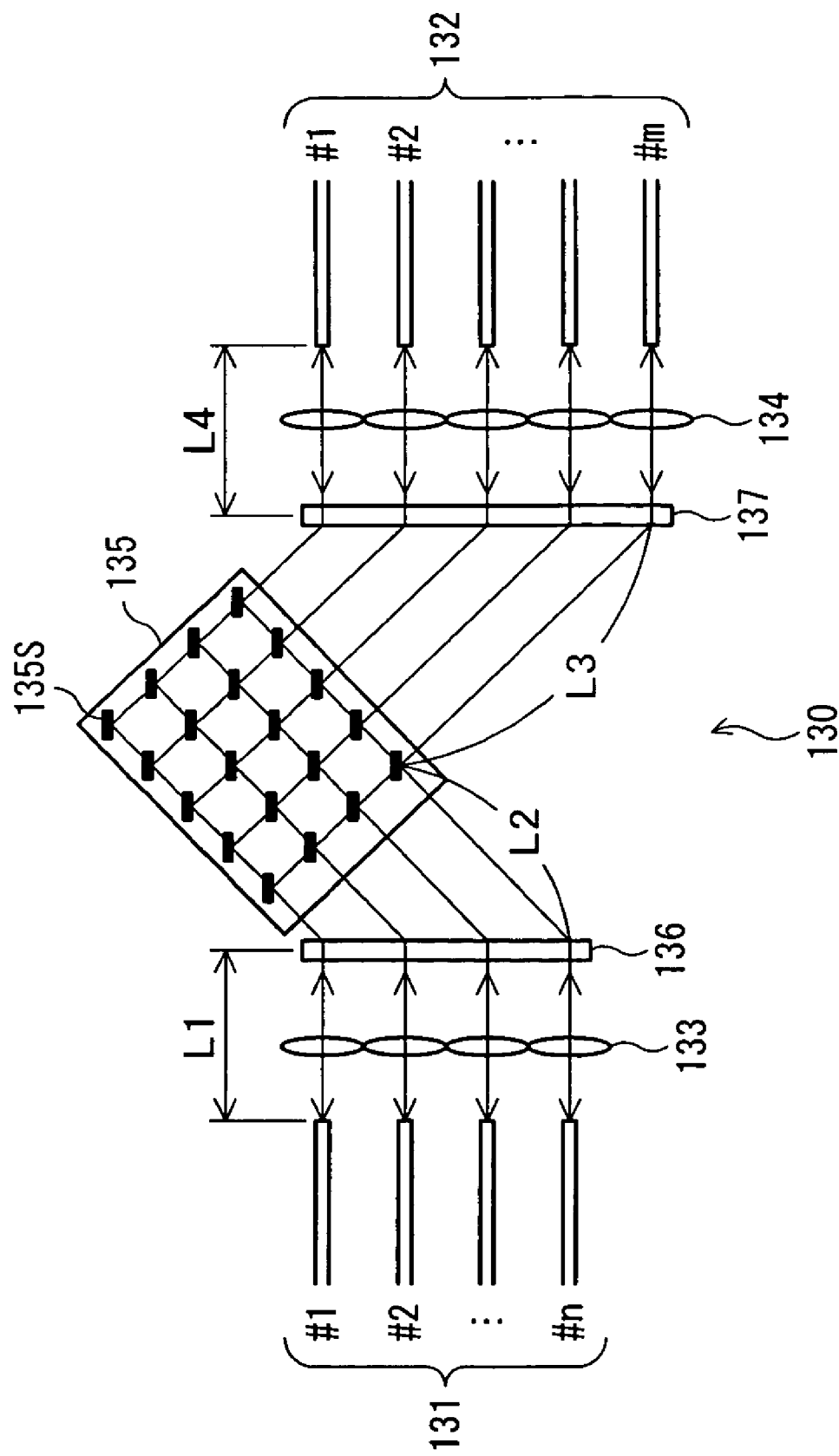

Moreover, the front ends of the optical fibers 11a to 14a and 61a to 64a can be arranged in alignment, thereby making it possible to make a positioning thereof together as a single array, and to considerably reduce the number of man-hours required for positioning compared to the cases shown in FIG. 18 and FIG. 20 described above, and an effect is obtained that the number of man-hours required for manufacture can be reduced.

Figure 19:
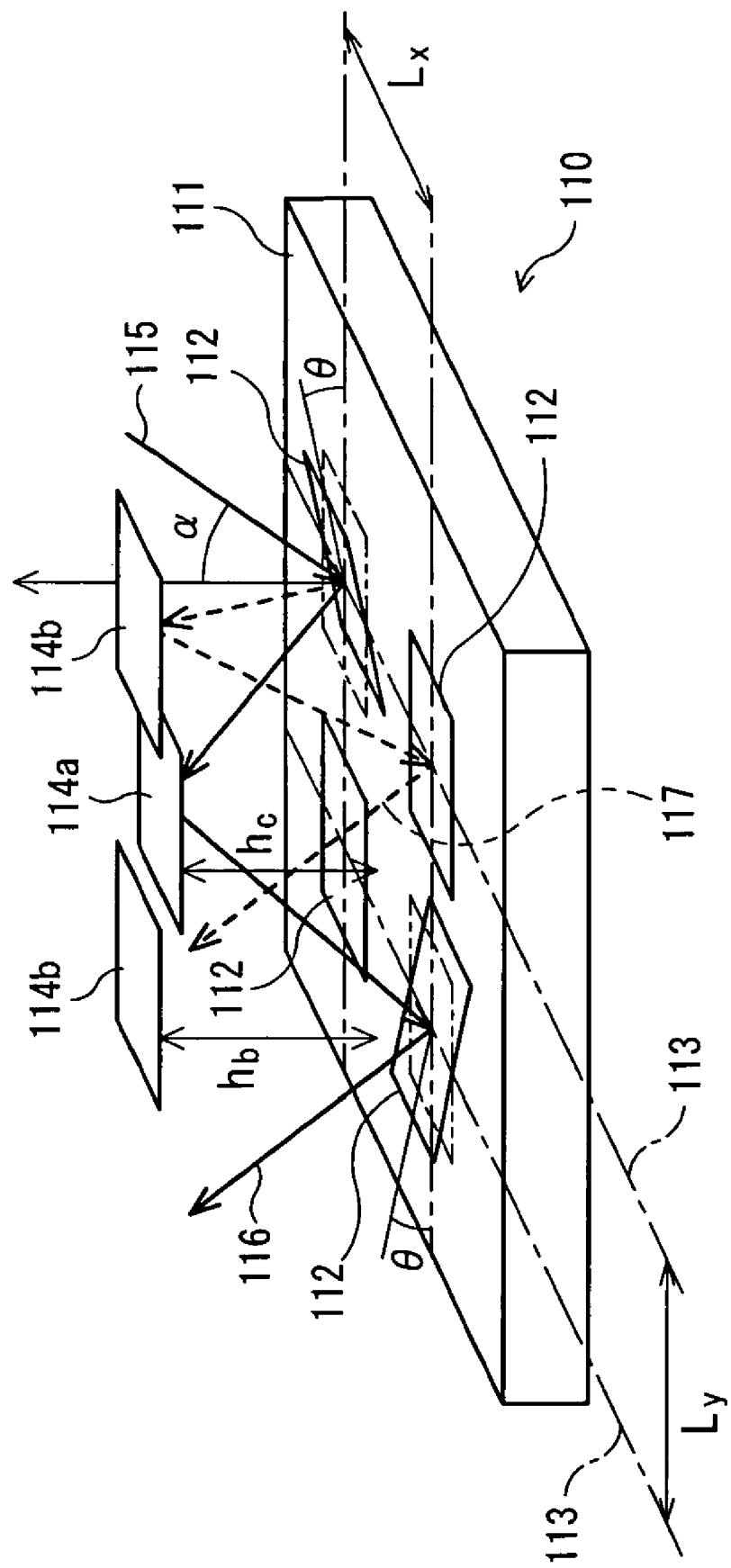

By constituting the movable reflection members 31 to 34 and 51 to 54 of the MEMS mirrors, the height of the mirrors can be made equal to each another, therefore, an advantage is obtained that the manufacture of the mirror is made easier compared to the case shown in FIG. 19 described above and further, such an effect can be obtained that the loss is reduced because the reflection by the MEMS mirror needs to be carried out only twice in order to switch over connections between the optical fibers.

Moreover, such an effect can be obtained that the optical loss is reduced because the difference in optical path length between ports depending on the route becomes small when an optical route is formed for optically connecting arbitrary one of the input ports 11 to 14 and arbitrary one of the output ports 61 to 64.

Figure 3A:
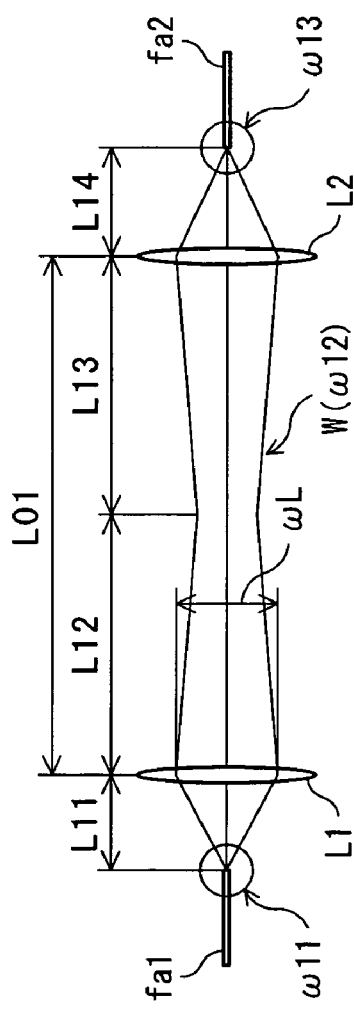
FIG. 3(a) to FIG. 3(c) and FIG. 4 to FIG. 7 are diagrams for explaining the operational effect according to the first embodiment compared to the conventional techniques.

The reason that the difference in optical path length increases the loss in the conventional technique is explained below with reference to FIG. 3. For example, as shown in FIG. 3(a), when two fibers fa1 and fa2 having the same core diameter and NA (Numerical Aperture) and two lenses L1 and L2 having the same focal length are arranged in such a manner that a distance L11 between the optical fiber fa1 and the lens L1 is made to equal a distance L14 between the optical fiber fa2 and the lens L2, a distance L12 between the lens L1 and a beam waist W is made to equal a distance L13 between the lens L2 and the beam waist W, and the distance between the lenses L1 and L2 is set to L01, the connection loss between the optical fibers fa1 and fa2 becomes minimized.

When a light beam is outputted from the optical fiber fa1 and the light beam is inputted to the optical fiber fa2, a spot size $\omega 13$ of the light beam at the optical fiber end face on the optical fiber fa2 side is equal to a spot size $\omega 11$ of the light beam at the end face on the optical fiber fa1. The spot sizes $\omega 11$ and $\omega 13$ are equal in magnitude, and a point (beam waist) at which the spot size becomes minimized and yet the wave surface becomes a plane wave coincides with the position of the end faces of the optical fibers fa1 and fa2, therefore, the connection loss becomes minimized.

Figure 3B:
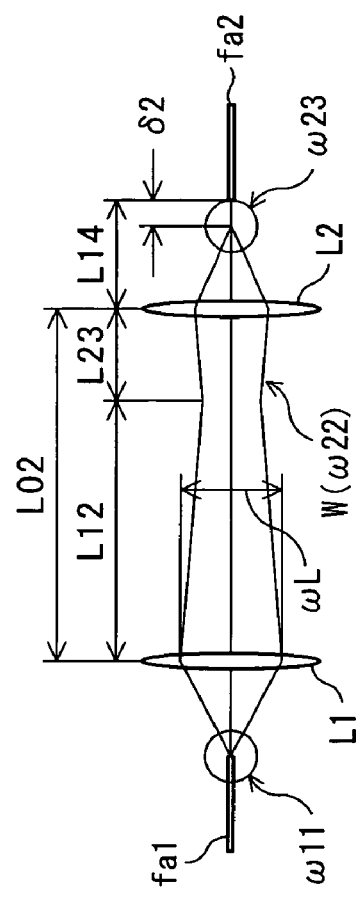

As shown in FIG. 3(b), when the lens L2 moves toward the lens L1 side and the distance between the lenses changes to L02 (L02<<L01), the beam waist of the light beams condensed by the lens L2 moves toward the lens side by $\delta 2$, the spot size $\omega 23$ of the beam waist becomes smaller than the spot size $\omega 11$, and thus the connection loss to the optical fiber fa2 is increased.

Figure 3C:
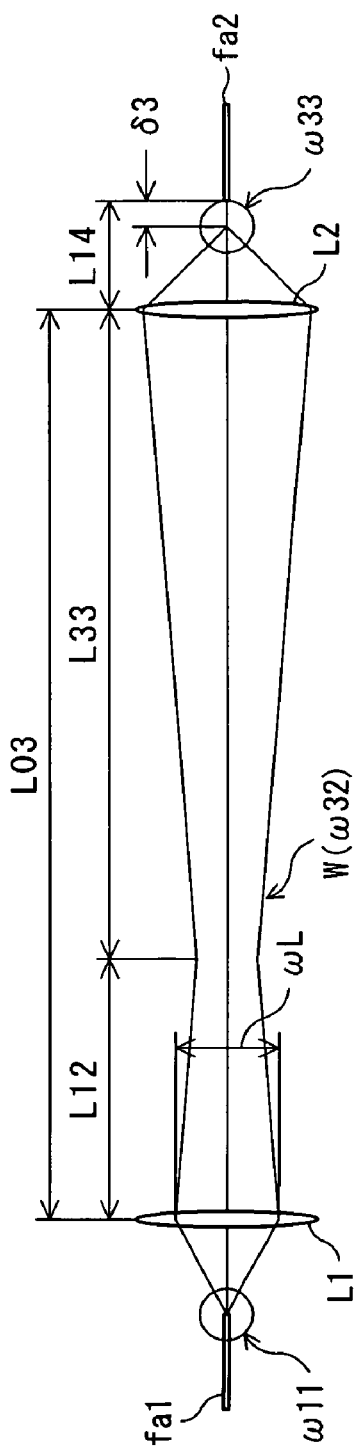

As shown in FIG. 3(c), also when the lens L2 becomes more distant from the lens L1 and the distance between the lenses changes to L03 (L03>>L01), the beam waist of the light beams condensed by the lens L2 moves toward the lens side by $\delta 3$, the spot size $\omega 33$ of the beam waist becomes smaller than the spot size $\omega 11$, and thus the connection loss to the optical fiber fa2 is increased.

Figure 4:
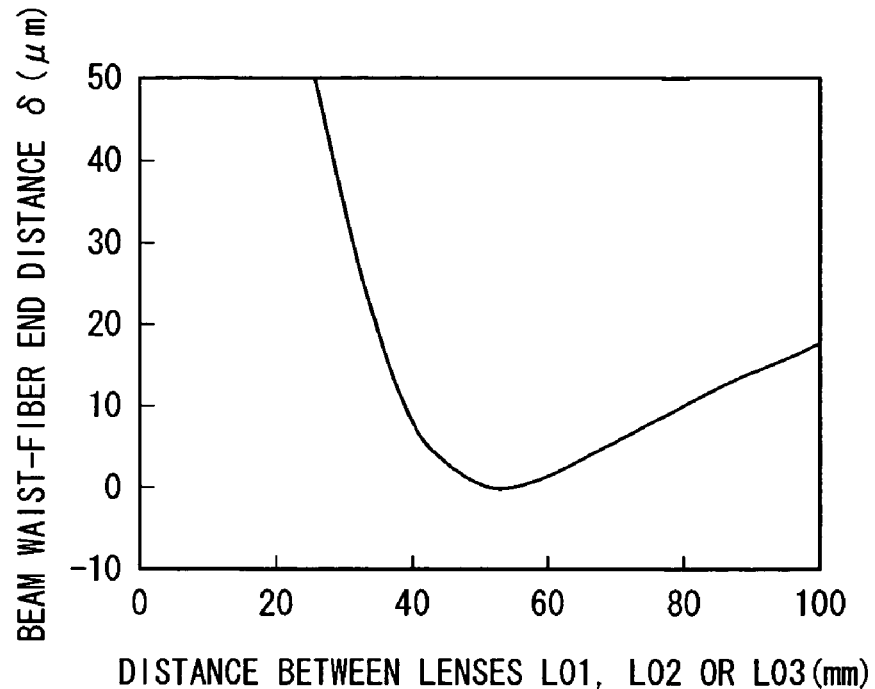

FIG. 4 is a graph showing $\delta$ under the variation of the distance between the lenses in an optical system in which the focal lengths of the lenses, the diameters of the lenses, and L11 and L14 exemplified in FIG. 3(a) to FIG. 3(c) are adjusted so that the optimum distance between the lenses [L01 in FIG. 3(a)] is 50 mm. When the distance between the lenses is 50 mm, $\delta$ (distance between the beam waist and the front end of the optical fiber fa2) is zero, but when the distance between the lenses deviates from 50 mm, $\delta$ deviates from zero, and it is found that the larger the deviation of the distance between the lenses from the optimum value (50 mm) is, the larger $\delta$ becomes. As $\delta$ increases, the connection loss to the optical fiber increases FIG. 5 is a graph showing the spot size at the beam waist when the distance between the lenses is changed in an optical system in which the focal lengths of the lenses, the diameters of the lenses, and L11 and L14 shown in FIG. 3(a) to FIG. 3(c) as an example are adjusted so that the optimum distance between the lenses [L01 in FIG. 3(a)] is 50 mm.

Figure 5:
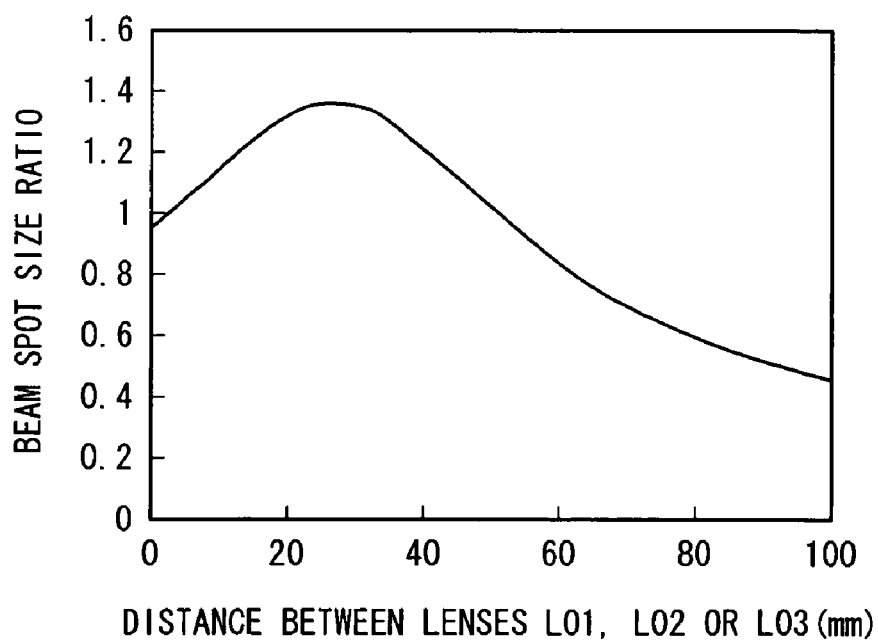

FIG. 5 is a plot of the ratio of the spot size on the optical fiber fa2 side to the spot size $\omega 11$ on the fiber fa1 side ($\omega 23/\omega 11$ or $\omega 33/\omega 11$) in FIG. 3(a) to FIG. 3(c). When the distance between the lenses is 50 mm, the ratio is 1, that is, the spot sizes are equal, but it is found that the larger the deviation of the distance between the lenses from the optimum value (50 mm) is, the larger the difference in the magnitude of the spot size becomes. If there is made a difference in the magnitude of the spot size, the connection loss to the optical fiber is produced and the larger the difference (or the ratio) is, the larger the loss becomes.

Figure 6:
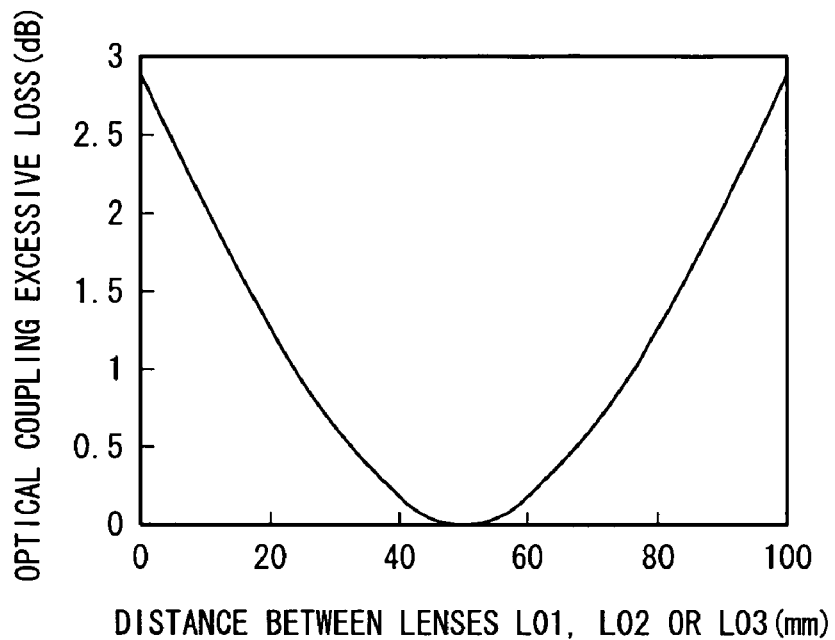

FIG. 6 is a graph showing the calculation result of the excessive loss caused by the deviation ($\delta$) of the beam waist from the optical fiber end and the difference in spot size. The horizontal axis represents the distance between the lenses. It is found that when the distance between the lenses is 50 mm, the excessive loss is zero but as the distance between the lenses deviates from 50 mm, the excessive loss begins to occur.

Figure 16:
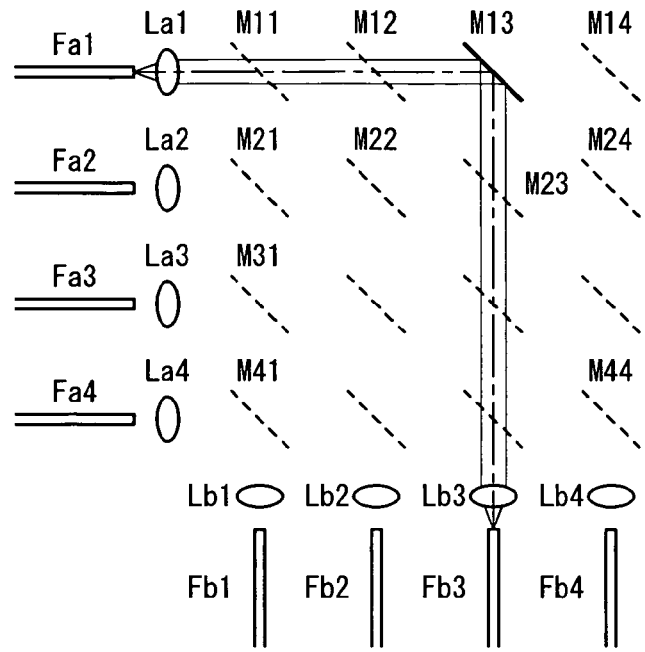
FIG. 16 to FIG. 21 are diagrams showing the conventional techniques.

For example, in the case of a conventional case shown as an example in FIG. 16, when the number of switch ports is N×N, the distance between the lenses changes in proportion to N to the second power at the maximum. Therefore, a considerably large loss is produced between ports other than those of which the distance between the lenses has been optimized.

In contrast to this, in the configuration of the first embodiment, the distances between the respective focal points f11 to f14 and the respective corresponding focal points f21 to f24 can be made equal to each another. The distance between the paraboloid constituting the first reflection surface S1 and the paraboloid constituting the second reflection surface S2 becomes shorter as the paraboloid become more distant from the focal point, but the difference in length can be easily reduced, for example, to about 10% or less. In other words, according to the optical switching device 1 in the first embodiment, it is possible to suppress the excessive loss caused by $\delta$ due to the difference in distance between ports and the difference in spot size.

It is possible to make the device more compact by reducing the distance between optical fibers to a relatively small one.

Moreover, it is possible to reduce the unevenness in the distance between optical fibers while attempting to make the device more compact without the need of a number of optical fibers unlike the device shown in FIG. 17.

On the other hand, the transparent block 10-1 that has integrally incorporated the first reflection surface S1 and second reflection surface S2 can be formed together by injection molding etc, and therefore an effect that the productivity is improved is obtained.

[A-3] Specific Design Example of the Paraboloid Constituting the First Reflection Surface S1 and Second Reflection Surface S2

Figure 7:
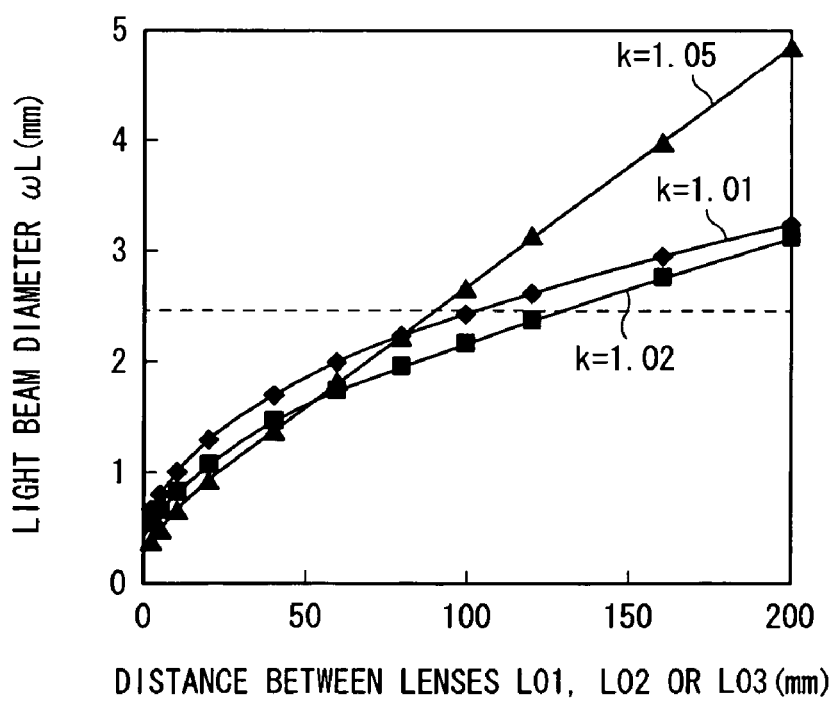

Next, a specific design example of the paraboloid constituting the first reflection surface S1 and second reflection surface S2 is shown. For example, FIG. 7 is a plot of a relationship between the distance between lenses in an optical system and the corresponding minimum value [corresponding to, for example, $\omega L$ in FIG. 3(a) to FIG. 3(c)] of the beam diameter on the lens. In the figure, k is a ratio of the distance between the fiber and the lens [for example, L11 in FIG. 3(a) to FIG. 3(c)] to the focal length of the lens (when the focal length is assumed to be FL, k=L11/FL) and corresponds to a coefficient, which is a ratio of the focal length of the parabolic mirror to the distance between the deflection means and the paraboloid in the present embodiment.

In the optical switching device 1 according to the present embodiment, for example, the focal lengths of the paraboloids constituting the first and second reflection surfaces S1 and S2 are set to 100 mm and the value of k to 1.02 respectively. Therefore, ML1 and ML2 in FIG. 2(a) and FIG. 2(b) are about 100 mm respectively. At this time, the beam diameter of the collimated light beams p11 to p14, p21 to p24, p31 to p34, and p41 to p44 (herein after, simply referred to as collimated light beams p11 to p44) that hit the first and second reflection surfaces S1 and S2 is about 2 mm. The interval between each of the collimated light beams p11 to p44 and the other in the longitudinal and transverse directions is set to 2.5 mm, which is greater than the beam diameter by 0.5 mm. Because of this, the thickness of the part at which the collimated light output sections 21 to 24 and the optical condensers 41 to 44 are stacked is about 10 mm [refer to ML4 in FIG. 2(a) and FIG. 2(b)].

At this time, it is possible to reduce the difference in optical path length of each of the collimated light beams p11 to p44 between each f the collimated light output sections 21 to 24 and each of the optical condensers 41 to 44 to 0.5 mm or less and an effect of low loss can be obtained.

[A2] First Modification of the First Embodiment

Figure 8:
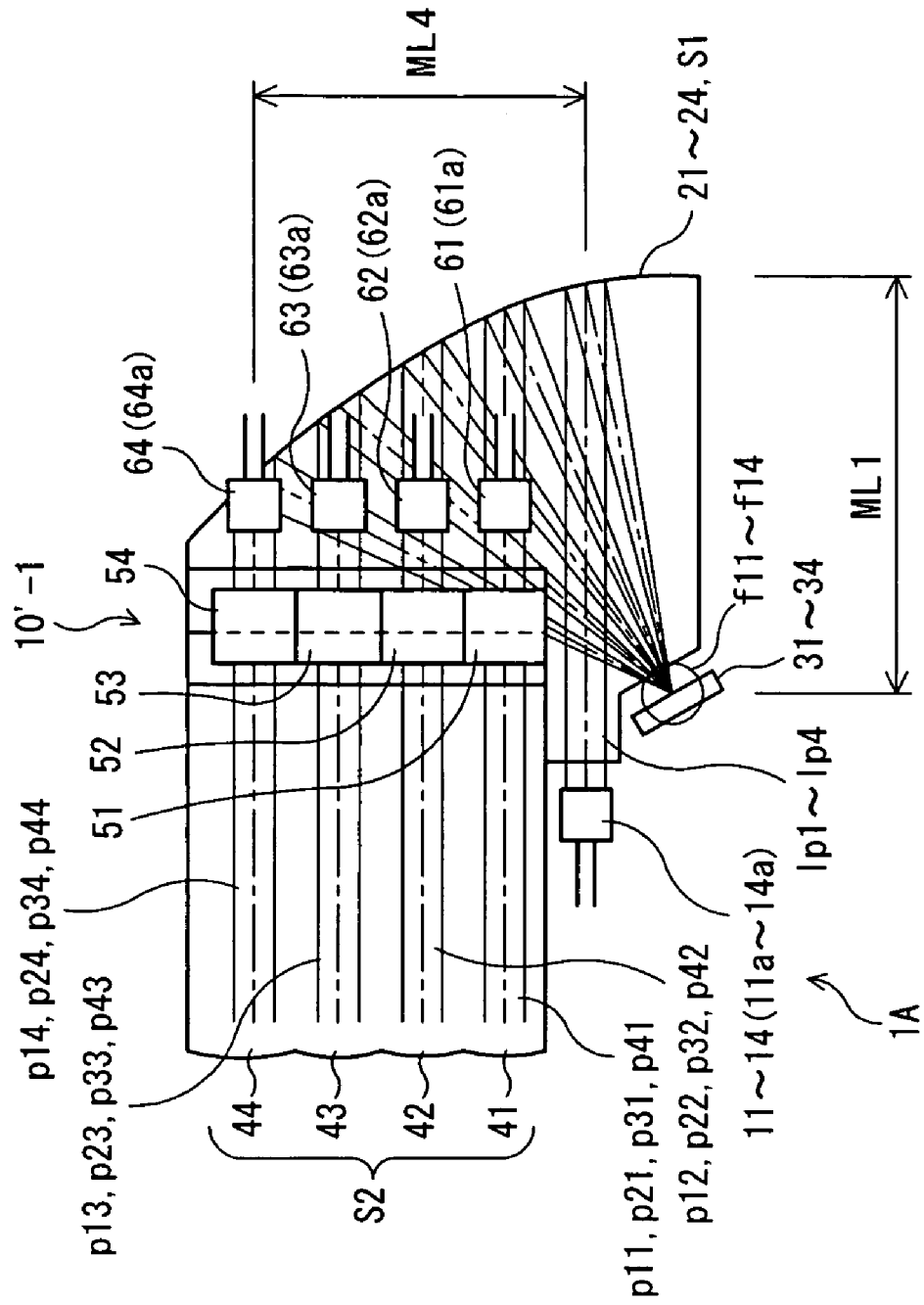
FIG. 8 is a diagram showing an optical switching device according to a first modification in the first embodiment.

FIG. 8 is a diagram showing part of an optical switching device 1A according to a first modification of the first embodiment of the present invention, corresponding to a diagram when viewed in the direction of arrow A in FIG. 1. In the optical switching device 1A shown in FIG. 8, the distance between the first reflection surface S1 and second reflection surface S2 (ML1 or ML3, which is not shown) can be shortened in the area in which the first ports 11 to 14 and the second ports 61 to 64 can be formed and the movable reflection members 31 to 34 and 51 to 54 can be mounted. Due to this, it is possible not only to reduce the size of the optical system, or more particularly, to totally shorten the optical path length between each of the first ports 11 to 14 and each of the second ports 61 to 64 but also to reduce the dimension of the transparent block 10'-1 in the lengthwise direction, and there is an advantage that the device can be made still more compact.

[A3] Second Modification of the First Embodiment

Figure 9:
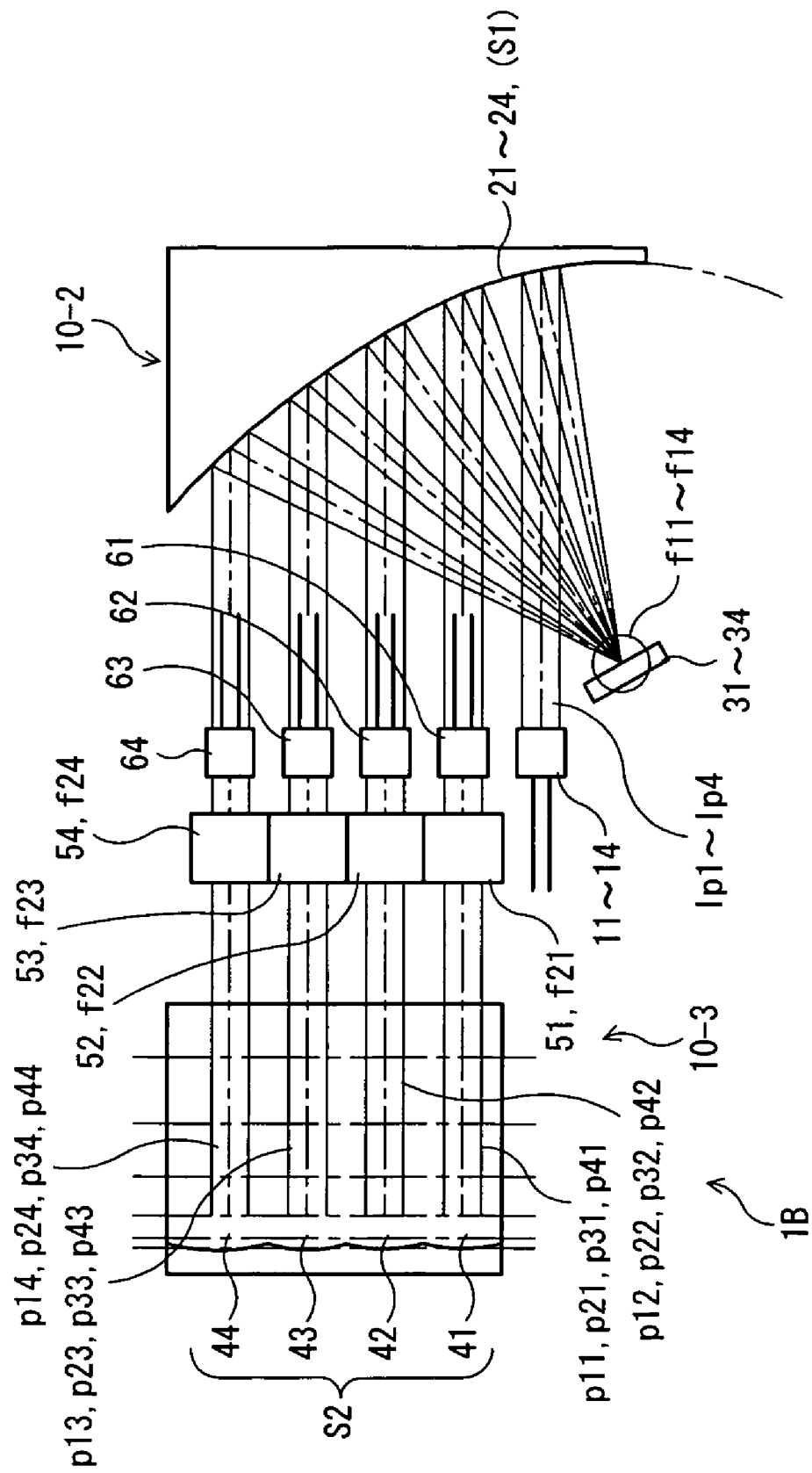
FIG. 9 is a diagram showing an optical switching device according to a second modification in the first embodiment.

FIG. 9 is a diagram showing an optical switching device 1B according to a second modification of the first embodiment of the present invention, corresponding to a diagram when viewed in the direction of arrow A in FIG. 1. The optical switching device 1B shown in FIG. 9 differs from the optical switching device 1 shown in FIG. 1, FIG. 2(a), and FIG. 2(b) described above in that the functions of the first reflection surface S1 and the second reflection surface S2 provided to the transparent block 10-1 are performed by members 10-2 and 10-3 separately provided and the light beams between each of the first ports 11 to 14 and each of the second ports 61 to 64 propagate in the air (in a gas) instead of in the transparent block 10-1. Here, the same symbols in FIG. 9 as those in FIG. 1, FIG. 2(a), and FIG. 2(b) denote substantially the same parts.

The members 10-2, 10-3 have the shapes of a concave paraboloid having the loci of parabolas a and b, respectively, as shown in FIG. 2(a) and FIG. 2(b) and reflect incoming light beams. In other words, the concave paraboloid constituting the member 10-2 functions as the first reflection surface S1 in the optical switching device 1 described above and at the same time, the concave paraboloid constituting the member 10-3 functions as the second reflection surface S2.

The member 10-2 and the member 10-3 can have basically similar configurations. In other words, by configuring the member 10-2 and the member 10-3 as members constituted of concave paraboloids having similar loci of parabolas and arranging the members 10-2 and 10-3 so that the planes including the respective loci of parabolas are substantially perpendicular to each other, it is possible, as in the case of the first embodiment described above, to make the member 10-2 shift the optical axes of the collimated light beams parallelly so that the optical axes are distributed in the direction of width of the figure and make the member 10-3 condense the collimated light beams the optical axes of which are distributed in the direction of height of the figure at the position of the substantially focal point.

The first ports 11 to 14, the optical fibers 11a to 14a, the second ports 61 to 64, the optical fibers 61a to 64a, and the movable reflection members 31 to 34 and 51 to 54 are arranged at respective positions corresponding to those in the optical switching device 1 in the first embodiment described above.

In the thus configured optical switching device 1B also, as in the optical switching device 1 described above, it is possible to connect the optical fibers 11a to 14a to arbitrary one of the optical fibers 61a to 64a, to which the optical fibers 11a to 14a are to be connected, both simultaneously and exclusively by setting the inclination angle of the reflection surface of the movable reflection members 31 to 34 and the movable reflection members 51 to 54, therefore, the same advantage as that of the first embodiment described above can be obtained.

According to the optical switching device 1B, the optical switching device can be configured by arranging the two members 10-2 and 10-3 the shape of which has been simplified compared to that of the transparent block 10-1 constituting the optical switching device 1, therefore, it is possible to manufacture the members 10-2 and 10-3 to be used as basic parts to configure the optical switching device more easily than the transparent block 10-1 in the first embodiment.

Moreover, the optical switching device 1B can be configured so that light beams propagate in the air, therefore, the absorption of light beams and the optical loss can be improved compared to the optical switching device 1 in which light beams propagate in the transparent block 10-1.

As in the embodiment described above, input and output ports may be provided at part of the ends of the surfaces S1 and S2.

[A4] Third Modification of the First Embodiment

Figure 10:
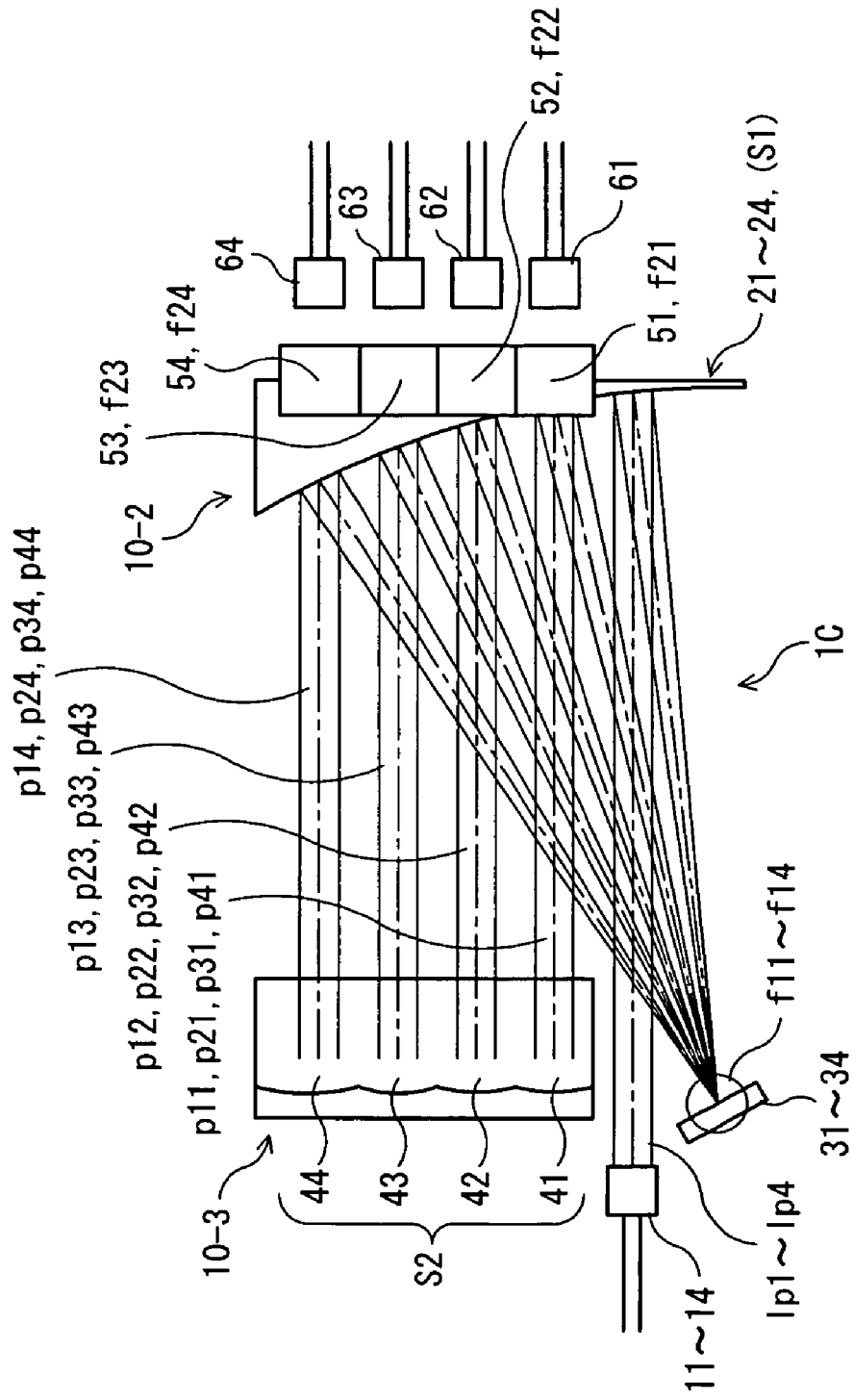
FIG. 10 is a diagram showing an optical switching device according to a third modification in the first embodiment.

FIG. 10 is a diagram showing an optical switching device 1C according to a third modification of the first embodiment of the present invention, corresponding to a diagram when viewed in the direction of arrow A in FIG. 1. Similarly to the optical switching device 1B shown in FIG. 9 described above, the optical switching device 1C shown in FIG. 10 is configured by the members 10-2 and 10-3 separately provided and functioning as the first reflection surface S1 and the second reflection surface S2. Further, the optical switching device 1C is configured so that the distance (ML1 or ML3, which is not shown) between the first reflection surface S1 and the second reflection surface S2 is relatively small in the area in which the first ports 11 to 14 and the second ports 61 to 64 can be formed and the movable reflection members 31 to 34 and 51 to 54 can be mounted. Due to this, the size of the optical system can be reduced and particularly, the optical path length between each of the first ports 11 to 14 and each of the second ports 61 to 64 can be shortened totally and there is an advantage that the device can be made more compact.

[A5] Fourth Modification of the First Embodiment

Figure 11:
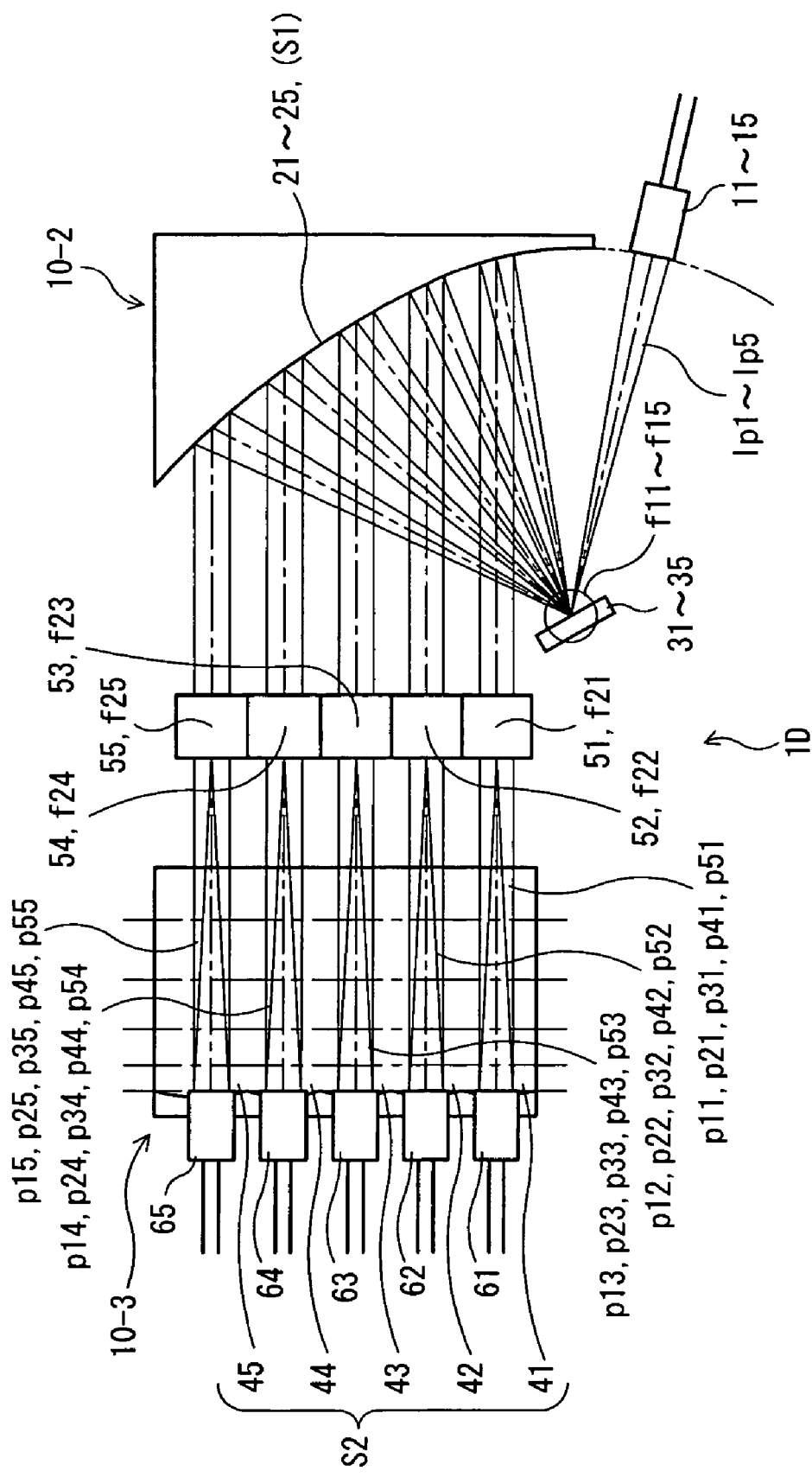
FIG. 11 is a diagram showing an optical switching device according to a fourth modification in the first embodiment.

FIG. 11 is a diagram showing an optical switching device 1D according to a fourth modification of the first embodiment of the present invention, corresponding to a diagram when viewed in the direction of arrow A in FIG. 1. Similarly to the optical switching devices 1B and 1C shown in FIG. 9 and FIG. 10 described above, the optical switching device 1D shown in FIG. 11 is configured by the members 10-2 and 10-3 separately provided and functioning as the first reflection surface S1 and the second reflection surface S2 but the way in which the first ports 11 to 15 and the movable reflection members 31 to 35 are optically connected and the way in which the second ports 61 to 65 and the movable reflection members 51 to 55 are optically connected are different from those in the optical switching devices 1B and 1C described above.

Due to the difference in the way of optical connection, a 5-input & 5-output optical switching device having one more ports can be configured while including the members 10-2 and 10-3 the scale of which is the same as that in the optical switching device 1B. Other parts of the configuration than described above are basically the same as those of the optical switching device 1B shown in FIG. 9 described above and the same symbols in FIG. 11 as those in FIG. 9 denote substantially the same parts.

The first ports 11 to 15 and the movable reflection members 31 to 35 described above are optically connected so that the light beams outputted from the optical fibers 11a to 15a via the first ports 11 to 15 are directly inputted to the movable reflection members 31 to 35 instead of being inputted to the movable reflection members 31 to 35 through the reflection by the first reflection surface S1, and the reflected light beams are condensed at the positions f11 to f15, being the positions of the substantially focal point of the loci of parabolas constituting the first reflection surface S1 of the member 10-2.

The second ports 61 to 65 and the movable reflection members 51 to 55 described above are optically connected so that when the light beams from the second reflection surface S2 constituting the member 10-3 enter the movable reflection members 51 to 55, the light beams directly enter the second ports 61 to 65 instead of entering the second ports 61 to 65 through the reflection by the second reflection surface S2.

Due to this, in the optical switching device 1D shown in FIG. 11, the reflection by the first reflection surface S1 required to make the light beams from the first ports 11 to 15 enter the movable reflection members 31 to 35 is omitted and at the same time, the reflection by the second reflection surface S2 required to guide the light beams made to enter the movable reflection members 51 to 55 to the second ports 61 to 65 is also omitted. Because of this, the area on the first reflection surface S1 and the second reflection surface S2 required for the reflection, which is omitted now, can be reserved for the light beams between ports, therefore, it is possible to increase the number of ports in the optical switching device by one compared to the optical switching devices 1B and 1C shown in FIG. 9 and FIG. 10 while maintaining the area of the parts of the members 10-2 and 10-3 which the light beams hit as the first and second reflection surfaces S1 and S2.

[A6] Fifth Modification in the First Embodiment

Figure 12:
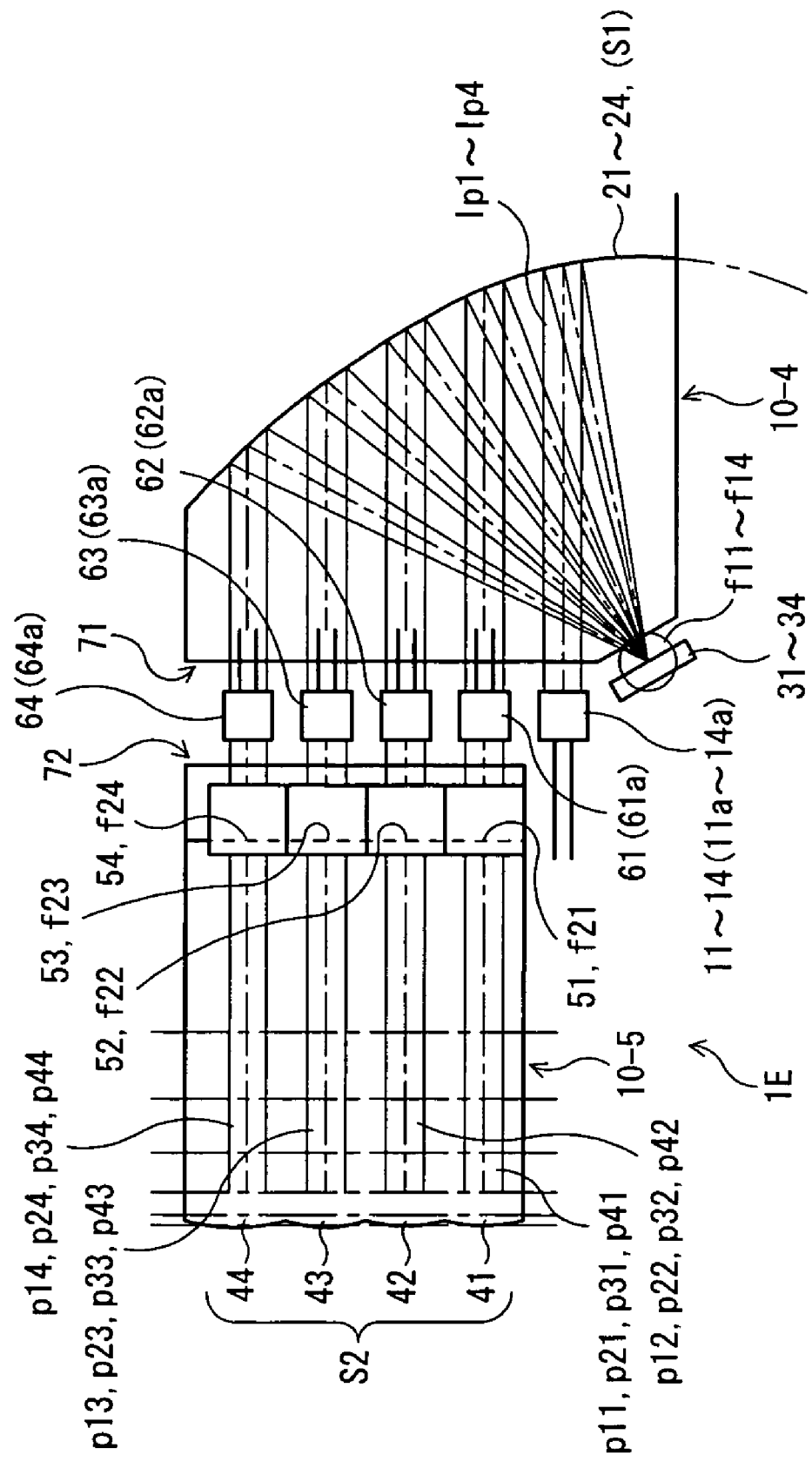
FIG. 12 is a diagram showing an optical switching device according to a fifth modification in the first embodiment.

FIG. 12 is a diagram showing an optical switching device 1E according to a fifth modification of the first embodiment of the present invention, corresponding to a diagram when viewed in the direction of arrow A in FIG. 1. The optical switching device 1E shown in FIG. 12 differs from the optical switching device 1 shown in FIG. 1, FIG. 2(a), and FIG. 2(b) described above in that the transparent block 10-1 in the optical switching device 1 is separated into two transparent blocks 10-4 and 10-5. Other parts of the configuration than described above are substantially the same as those of the optical switching device 1. The same symbols in FIG. 12 as those in FIG. 1, FIG. 2(a), and FIG. 2(b) denote substantially the same parts.

In other words, the transparent block 10-4 has the first reflection surface S1, the optical fibers 11a to 14a are connected via the first ports 11 to 14, and the movable reflection members 31 to 34 are fixed on the position of the focal point of the loci of parabolas constituting the first reflection surface S1. Similarly, the transparent block 10-5 has the second reflection surface S2, the optical fibers 61a to 64a are connected via the second ports 61 to 64, and the movable reflection members 51 to 54 are fixed on the position of the focal point of the loci of parabolas constituting the second reflection surface S2.

The transparent block 10-4 is a first member for forming a sub-unit including a plurality of collimated light output section 21 to 24. And, the transparent block 10-5 is a second member for forming a sub-unit including a plurality of optical condenser 41 to 44.

Incidentally, the transparent block 10-1 shown in FIG. 1, FIG. 2(a), and FIG. 2(b) described above has a structure that the aforementioned first member and the second member are formed integrally together with a single transparent block.

Then, the optical switching device 1E that performs the same function as that of the optical switching device 1 in the first embodiment described above can be configured by arranging a surface 71 of the transparent block 10-4 from which collimated light beams are outputted and a surface 72 of the transparent block 10-5 that introduces the collimated light beams made to enter the second reflection surface S2 in opposition to each other (or in contact with each other).

At this time, the transparent block 10-4 and the transparent block 10-5 described above have a positional relationship in which the respective planes including the loci of parabolas and constituting the respective reflection surfaces are perpendicular but the shape of the paraboloid constituting the respective transparent blocks 10-4 and 10-5 can be made equal, therefore, the shape of the respective transparent blocks 10-4 and 10-5 alone can be formed into the same shape.

Figure 13:
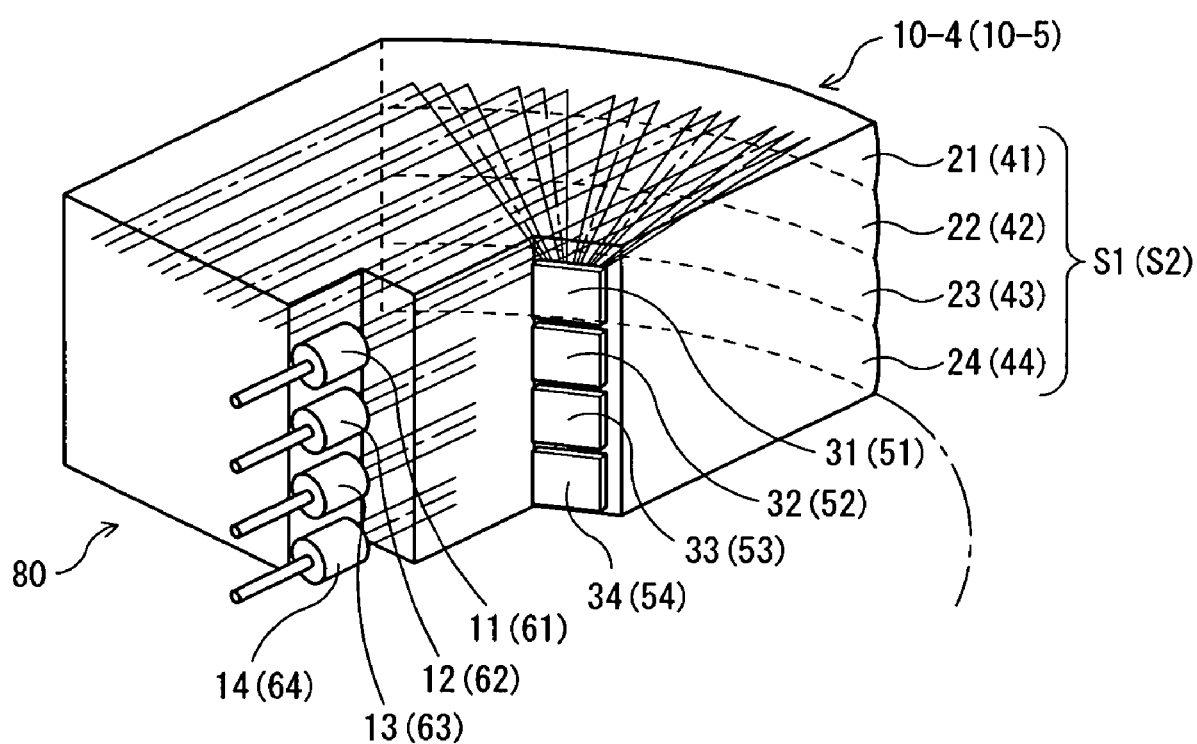
FIG. 13 is a diagram showing an optical member unit according to the fifth modification in the first embodiment.

In other words, in the optical switching device 1E shown in FIG. 12, a first (second) optical member sub-unit 80, which is configured by providing the movable reflection members 31 to 34 (51 to 54) and the ports 11 to 14 (61 to 64) for the transparent block 10-4 (10-5) corresponding to one of two blocks into which the transparent block 10-1 was divided as shown in FIG. 13, can be used as a basic part to manufacture the optical switching device 1E, therefore, it is possible to configure the optical switching device 1E with the simplified manufacture process to which the optical member units 80 have been applied. That is, the switch is configured by manufacturing the optical member unit 80, which is a simpler part than that in the optical switching device 1, and just by combining two of the optical member units 80, therefore, it is possible to make the manufacture of the optical switching device 1E easier and it is made possible to replace parts based on the unit.

[B1] Description of Second Embodiment

[B1] Configuration

FIG. 14(a) and FIG. 14(b) are diagrams showing an optical switching device 1F according to a second embodiment of the present invention. FIG. 14(a) is a top view thereof and FIG. 14(b) is a diagram when viewed in the direction of arrow B in FIG. 14(a). In other words, FIG. 14(a) and FIG. 14(b) are external views when the optical switching device 1F is viewed from the directions perpendicular to each other. The optical switching device 1F according to the second embodiment differs from the optical switching devices 1 and 1A to 1E in the first embodiment and the respective modifications described above in that the collimated light output section and the optical condenser are constituted of a lens optical system of a transparent type.

In other words, the optical switching device 1F according to the second embodiment is configured by including convex lenses 21a to 24a as a collimated light output section and convex lenses 41a to 44a as an optical condenser and at the same time, including the movable reflection members 31 to 34 as an input light deflection section and the movable reflection members 51 to 54 as an output light deflection section, in which light beams inputted from the optical fibers 11a to 14a can be guided to any one of the optical fibers 61a to 64a by setting the reflection angle of the movable reflection members 31 to 34 and 51 to 54.

Also in the optical switching device 1F according to the second embodiment, the optical fibers 11a to 14a and 61a to 64a have the positional relationship corresponding to the case of the first embodiment described above. In other words, the optical fibers 11a to 14a and 61a to 64a are arranged so that the direction of arrangement of the four optical fibers 11a to 14a and the direction of arrangement of the four optical fibers 61a to 64a are perpendicular to each other, the optical axes of the respective optical fibers 11a to 14a and 61a to 64a are not aligned, and the end faces of the optical fibers 11a to 14a and the end faces of the optical fibers 61a to 64a face opposite directions. FIG. 14(a) corresponds to a view in the direction shown in FIG. 2(a) described above and FIG. 14(b) corresponds to a view in the direction shown in FIG. 2(b).

Moreover, it is possible to interpose respective lenses 11b to 14b for collimating the respective light beams inputted from the optical fibers 11a to 14a between the respective optical fibers 11a to 14a and the respective convex lenses 21a to 24a as components constituting the input ports. Due to this, the respective light beams from the optical fibers 11a to 14a are made to enter the respective movable reflection members 31 to 34 via the respective lenses 11b to 14b and the respective convex lenses 21a to 24a.

The movable reflection members 31 to 34, which are arranged at the position of the substantially focal point of the convex lenses 21a to 24a [for example, arranged at the position (k=1.02) of a distance of 1.02 times the focal length used in [A-3]] and are reflection members configured rotatably in the direction a parallel to the paper in FIG. 14(a), can reflect the light beams Ip1 to Ip4 inputted from the optical fibers 11a to 14a toward the convex lenses 21a to 24a respectively as the deflected light beams p11 to p14, p21 to p24, p31 to p34, and p41 to p44 the angles of which are set on the same plane, as shown in FIG. 14(a). The removable reflection members 31 to 34 can also be constituted of MEMS mirrors.

The convex lenses 21a to 24a have the functions corresponding to the collimated light output sections 21 to 24 constituting the first reflection surface S1 in the optical switching device 1 according to the first embodiment described above and the convex lenses 41a to 44a have the functions corresponding to the optical condensers 41 to 44 constituting the second reflection surface S2 in the optical switching device 1 according to the first embodiment described above The convex lenses 21a to 24a and 41a to 44a each have a shape obtained by arranging four of slices, which are each one of the central part of a circular convex lens cut into slices, in alignment to form them integrally into a single body, and are arranged in such a manner that the mutual difference in angle is 90 degrees through rotation about the axis parallel to the direction in which the light beam travels. The distance ML2 between each of the convex lenses 21a to 24a and each of the convex lenses 41a to 44a can be set to, for example, about 10 mm.

The focal length of the convex lenses 21a to 24a and convex lenses 41a to 44a is, for example, about 50 mm and the movable reflection members 31 to 34 and 51 to 54 are arranged at the position of a distance of 1.02 times the focal length (that is, K=1.02, as defined above). Therefore, in the figure, it seems that ML1, which is the distance between each of the movable reflection members 31 to 34 and each of the convex lenses 21a to 24a (and the distance between each of the movable reflection members 51 to 54 and each of the convex lenses 41a to 44a), and ML2 described above are substantially the same, but actually ML2 and ML1 can be made to satisfy ML2>ML1.

Figure 15B:
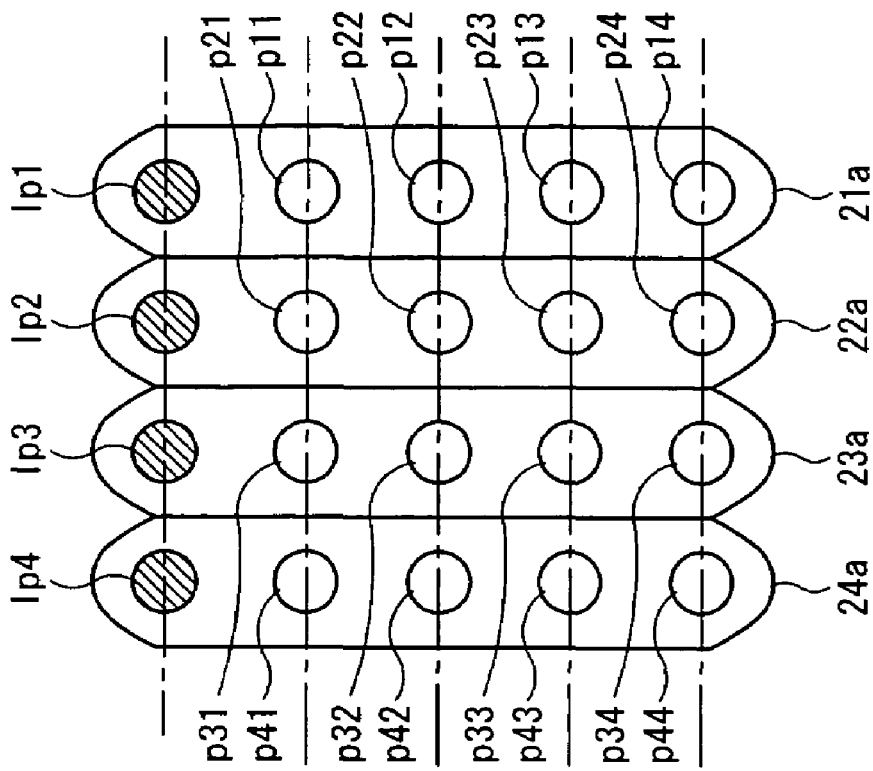
FIG. 15(a) and FIG. 15(b) are diagrams schematically showing arrangement of beams passing through a convex lens constituting the optical switching device according to the second embodiment.
Figure 15A:
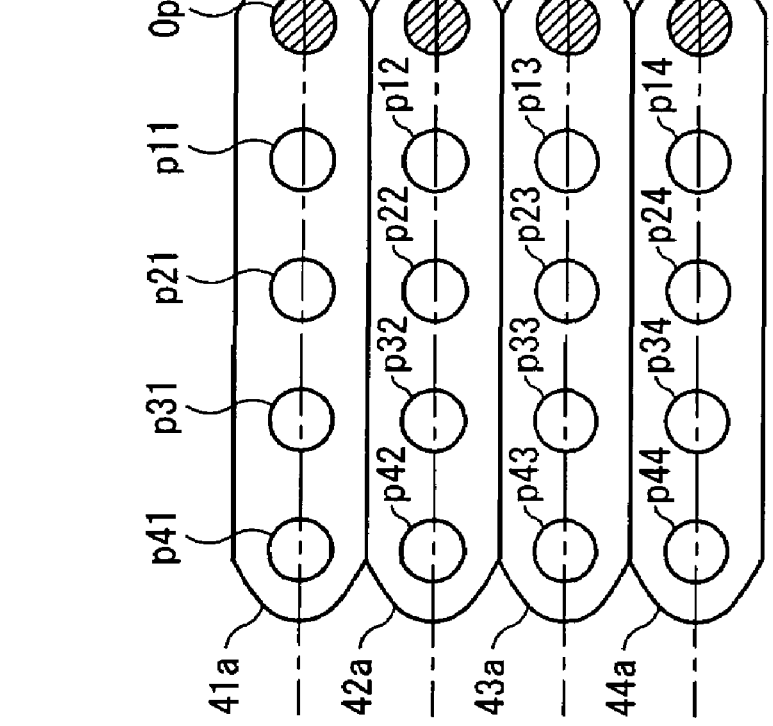

FIG. 15(a) is a diagram schematically showing the beam arrangement of the defected light beams p11 to p14, p21 to p24, p31 to p34, and p41 to p44 when viewed from the input side of the light beams Ip1 to Ip4 from the optical fibers 11a to 14a of the convex lenses 21a to 24a. In other words, FIG. 15(a) is a diagram showing the incident position of the light beams Ip1 to Ip4 on the convex lenses 21a to 24a and also showing the beam arrangement of the light beams p11 to p14, p21 to p24, p31 to p34, and p41 to p44 reflected by the movable reflection members 31 to 34 and passing therethrough. The maximum diameter of the collimated light beam is, for example, about 2 mm and the distance between a specific beam center axis and another beam center axis can be set to, for example, about 3 mm.

If the light beam Ip1 inputted from the optical fiber 11a is taken as an example, the light beam Ip1 enters the movable reflection member 31 via the lens 11b and the convex lens 21a and is reflected toward the convex lens 21a as the deflected light beam p11, p12, p13, or p14 according to the setting of the angle of the reflection surface of the movable reflection member 31. Then, the convex lens 21a outputs the deflected light beams p11 to p14 toward the convex lenses 41a to 44a as the collimated light beams the optical axes of which have been translated parallelly from each another.

Similarly to the case of the light beam Ip1, the light beams Ip2 to Ip4 inputted from the other optical fibers 12a to 14a enter the movable reflection members 32 to 34 via the lenses 12b to 14b and the convex lenses 22a to 24a and are reflected toward the convex lenses 22a to 24a as the deflected light beams p21 to p24, p31 to p34, and p41 to p44 according to the setting of the angle of the reflection surface of the movable reflection members 32 to 34. Then, the convex lenses 22a to 24a output the deflected light beams p21 to p24, p31 to p34, and p41 to p44 toward the convex lenses 41a to 44a as the collimated light beams the optical axes of which have been translated parallelly from each another.

Therefore, the movable reflection member 31 and the convex lens 21a, the movable reflection member 32 and the convex lens 22a, the movable reflection member 33 and the convex lens 23a, and the movable reflection member 34 and the convex lens 24a form respective pairs of the input light deflection section and the collimated light output section, and are formed into a four-row structure in which four pairs of the input light deflection section and the collimated light output section are stacked.

FIG. 15(b) is a diagram schematically showing the beam arrangement of the collimated light beams p11 to p14, p21 to p24, p31 to p34, and p41 to p44 passing through the convex lenses 41a to 44a serving as an optical condenser and at the same time, showing the beam arrangement of reflected light beams 0p1 to 0p4 guided to the optical fibers 61a to 64a through the reflection by the movable reflection members 51 to 54 when viewed from the side of the movable reflection members 51 to 54.

For example, the convex lens 41a as an optical condenser allows the collimated light beams p11, p21, p31, and p41 from the convex lenses 21a to 24a to pass through and condenses the light beams on the reflection surface of the movable reflection member 51 arranged at the position of the substantially focal point of the convex lens 41a. The respective collimated light beams p11, p21, p31, and p41 passing through the convex lens 41a originate from the light beams Ip1 to Ip4 reflected at the movable reflection members 31 to 34 with the same angle.

Similarly, the convex lens 42a can allow the collimated light beams p12, p22, p32, and p42 from the convex lenses 21a to 24a to pass through and condense the light beams on the reflection surface of the movable reflection member 52, the convex lens 43a can allow the collimated light beams p13, p23, p33, and p43 from the convex lenses 21a to 24a to pass through and condense the light beams on the reflection surface of the movable reflection member 53, and the convex lens 44a can allow the collimated light beams p14, p24, p34, and p44 from the convex lenses 21a to 24a to pass through and condense the light beams on the reflection surface of the movable reflection member 54.

Therefore, the respective convex lenses 41a to 44a can receive the four collimated light beams in parallel to each another inputted thereto in a specific direction from the pairs of the input light deflection section and the collimated light output section stacked into the four-row structure and can condense the inputted four collimated light beams on the reflection surface of the movable reflection members 51 to 54, which is a substantially specific position, per the collimated light beams parallelly translated in accordance with the angle set by the movable reflection members 31 to 34 as an input light deflection section constituting the respective pairs of the input light deflection section and the collimated light output section and having the position of substantially the same optical axis.

The respective movable reflection members 51 to 54 receive the collimated light beams condensed by the convex lenses 41a to 44a and are configured in such a manner that the reflection surface angle can be set rotatably in the direction b shown in FIG. 14(b) in order to guide any one of the collimated light beams to the optical fibers 61a to 64a.

For example, the movable reflection member 51 is optically connected to the optical fiber 61a via the convex lens 41a and can guide any one of the collimated light beams p11, p21, p31, and p41 to the optical fiber 61a by setting the reflection surface angle. Similarly, the movable reflection member 52 is optically connected to the optical fiber 62a via the convex lens 42a and can guide any one of the collimated light beams p12, p22, p32, and p42 to the optical fiber 62a by setting the reflection surface angle.

Further, the movable reflection member 53 is optically connected to the optical fiber 63a via the convex lens 43a and can guide any one of the collimated light beams p13, p23, p33, and p43 to the optical fiber 63a by setting the reflection surface angle. The movable reflection member 54 is optically connected to the optical fiber 64a via the convex lens 44a and can guide any one of the collimated light beams p14, p24, p34, and p44 to the optical fiber 64a by setting the reflection surface angle.

In other words, based on the setting of the reflection surface angle by the movable reflection members 51 to 54, only the light beams that pass through the positions 0p1 to 0p4, which are specific positions on the convex lenses 41a to 44a shown in FIG. 15(b), are guided to the optical fibers 61a to 64a in the post stage.

Because of this, the movable reflection members 51 to 54 can guide any one of the light beams from the pairs of the input light deflection section and the collimated light output section stacked into the four-row structure, which were condensed by the convex lenses 41a to 44a serving as an optical condenser, to the corresponding optical fibers 61a to 64a, which are the output direction-paths, by deflecting the four light beams condensed per the position of the optical axis.

It is also possible to interpose respective lenses 61b to 64b as components constituting the output ports between the respective optical fibers 61a to 64a and the respective convex lenses 41a to 44a for guiding the respective light beams 0p1 to 0p4, which have passed through the convex lenses 41a to 44a and are to be guided to the optical fibers 61a to 64a, to the optical fibers 61a to 64a. Due to this, the respective light beams from the movable reflection members 51 to 54 are bound to enter the optical fibers 61a to 64a via the respective convex lenses 41a to 44a and the respective lenses 61b to 64b.

[B2] Operational Effect

With the above-mentioned configuration, as in the optical switching device 1 according to the first embodiment described above, also in the optical switching device 1F according to the second embodiment of the present invention, it is possible to connect the optical fibers 11a to 14a to any one of the optical fibers 61a to 64a to, which the optical fibers 11a to 14a are to be connected, both simultaneously and exclusively based on the setting of the inclination angle of the reflection surface by the movable reflection members 31 to 34 and the movable reflection members 51 to 54.

As described above, the optical switching device 1F according to the second embodiment of the present invention includes the movable reflection members 31 to 34 serving as an input light deflection section and the movable reflection members 51 to 54 as an output light deflection member as well as the convex lenses 21a to 24a and the convex lenses 41a to 44a, therefore, as in the case of the first embodiment described above, there is an advantage that an optical switching device, which is capable of guiding light beams from the optical fibers 11a to 14a constituting the input ports to arbitrary one of the optical fibers 61a to 64a constituting the output ports both simultaneously and exclusively and in which the difference in connection optical path length is suppressed, can be realized with the reduce number of movable reflection members compared to the conventional technique.

Moreover, it is possible to realize a multi-input×multi-output (in the first embodiment, 4-input×4-output) optical switch that does not require connection with optical fibers within the switch as shown in FIG. 17.

Still moreover, the front ends of the optical fibers 11a to 14a and 61a to 64a can be arranged in alignment, thereby making it possible to make a positioning thereof together as a single array, and to considerably reduce the number of man-hours required for positioning compared to the cases shown in FIG. 18 and FIG. 20 described above, and an effect is obtained that the number of man-hours required for manufacture can be reduced.

By constituting the movable reflection members 31 to 34 and 51 to 54 of the MEMS mirrors, the height of the mirrors can be made equal to each another, therefore, an advantage is obtained that the manufacture of the mirror is made easier compared to the case shown in FIG. 19 described above and further, such an effect can be obtained that the loss is reduced because the reflection by the MEMS mirror needs to be carried out only twice in order to switch over connections between the optical fibers.

Moreover, such an effect can be obtained that the optical loss is reduced because the difference in optical path length between ports depending on the route becomes small when an optical route is formed for optically connecting arbitrary one of the input ports 11 to 14 and arbitrary one of the output ports 61 to 64.

Still moreover, it is possible to make the device more compact by reducing the distance between each of the convex lenses 21a to 24a and each of the lenses 41a to 44a or the distance between each of the optical fibers 11a to 14a and each of the optical fibers 61a to 64a to a value smaller than that in the case of the conventional technique.

[C] Others

In the first embodiment, the respective modifications, and the second embodiment described above, the optical switching devices 1 and 1A to 1F are configured as a four-input & four-output optical switching device, but according to the present invention, it is also possible, as a matter of course, to configure an N-input & M-output optical switching device for performing switchover with a different number of input and output ports.

In this case, it is possible to configure an optical switching device by appropriately setting the number of collimated light output sections 21 to 24 or convex lenses 21a to 24a of the first reflection surface S1 and the number of movable reflection members 31 to 34 as an input light deflection section in accordance with the number N of input ports, respectively, and at the same time, by appropriately setting the number of optical condensers 41 to 44 or convex lenses 41a to 44a of the second reflection surface S2 and the number of movable reflection sections 51 to 54 as an output light deflection section in accordance with the number M of output ports, respectively.

For example, by setting the number of input ports to "1", it is possible to configure a 1-input & M-output optical switching device including the single collimate light output section 21 and the single movable reflection member 31 and capable of outputting the collimated light beams the optical axis position of which has been shifted parallelly through any one of the output ports corresponding to the number of optical condensers constituting the second reflection surface S2 and the number of movable reflection members as an output light deflection section based on the setting of the reflection surface angle of the movable reflection member 31.

Moreover, in the first embodiment and the respective modifications described above, a case is described in detail where an optical switching device is configured so that the first ports 11 to 14 (optical fibers 11a to 14a) are used as the input side and the second ports 61 to 64 (optical fibers 61a to 64a) are used as the output side, however, the present invention is not limited to this and it is also possible, as a matter of course, to reverse the positional relationship of the input ports and the output ports shown in the figure, that is, an optical switching device is configured so that the first ports 11 to 14 (optical fibers 11a to 14a) are used as the output side and the second ports 61 to 64 (optical fibers 61a to 64a) are used as the input side.

What is claimed is:

1. An optical switching device, comprising:
    an input light deflection section comprising multiple movable deflection members, each respective deflection member being capable of deflecting a respective input light beam of a plurality of input light beams at one of a plurality of different deflection angles being selected in a same plane, and outputting said deflected input light beam;
    a collimated light output section capable of reflecting the deflected input light beams deflected by each deflection member and outputting said deflected and reflected light beams as collimated light beams, where each collimated light beam has one of a plurality of optical axes being in a relationship of parallel translation to each other, said one of the plurality of optical axes being defined in accordance with the respective selected deflection angle; and
    an output direction-path guide section for guiding the collimated light beams from said collimated light output section to respective output direction-paths in accordance with the respective optical axes,
    wherein said collimated light output section is constituted of a member having a paraboloid-type reflection surface and the deflection members of said input light deflection section are provided at positions of substantially focal points of said paraboloid.

2. The optical switching device according to claim 1, wherein said output direction path guide section further comprises:
    an optical condenser that condenses the collimated light beam; and
    multiple output side movable deflection members, each respective output side movable deflection member being disposed corresponding to a respective one of the plurality of optical axes and a respective one of the output direction paths, and capable of deflecting a respective light beam from the output light deflection section to the respective output direction path.

3. The optical switching device according to claim 2, wherein in the collimated light output section, the optical condenser and an optical path between the collimated light output section and the optical condenser are formed integrally as a single block.

4. The optical switching device according to claim 3, wherein the movable deflection members of the input light deflection section and/or the output side multiple movable deflection members are fixed on the single block.

5. An apparatus comprising:
    a plurality of deflectors deflecting input light beams at respective deflection angles, each respective deflection angle being selected from a plurality of different deflection angles in a same plane;
    a collimated light output section reflecting the deflected input light beams so that the reflected input light beams are collimated light beams having respective optical axes, where each respective axis is determined from a plurality of optical axes in parallel translation to each other in accordance with the respective selected deflection angle; and
    an output direction path guide section guiding the collimated light beams to respective output direction paths in accordance with the respective optical axes, the apparatus thereby operating as an optical switch to switch the input light beams from inputs of the apparatus to the respective output direction paths,
    wherein the collimated light output section is a paraboloid reflection surface, and the deflectors are positioned at focal points of the paraboloid reflection surface.

6. An apparatus comprising:
    a plurality of deflectors deflecting input light beams at respective deflection angles, each respective deflection angle being selected from a plurality of different deflection angles in a same plane;
    a collimated light output section reflecting the deflected input light beams so that the reflected input light beams are collimated light beams having respective optical axes, where each respective optical axis is determined from a plurality of optical axes in parallel translation to each other in accordance with the respective selected deflection angle; and an output direction path guide section guiding the collimated light beams to output direction paths in accordance with the respective optical axes, the apparatus thereby operating as an optical switch to switch the input light beams from inputs of the apparatus to the respective output direction paths, wherein the respective deflection angles are selected by changing inclination angles of the deflectors.

7. An apparatus comprising:

means for deflecting a plurality of input light beams at respective deflection angles, each respective deflection angle being selected from a plurality of different deflection angles in a same plane;

means for reflecting the deflected input light beams so that the reflected input light beams are collimated light beams having respective optical axes, where each respective optical axis is determined from a plurality of optical axes in parallel translation to each other in accordance with the respective selected deflection angle; and means for guiding the collimated light beams to output direction paths in accordance with the respective optical axes, the apparatus thereby operating as an optical switch to switch the input light beams from inputs of the apparatus to the respective output direction paths, wherein the respective deflection angles are selected by changing inclination angles of the means for deflecting.

8. An optical switch device comprising:

an input light deflection section having a plurality of deflectors for deflecting input light beams, wherein each respective deflector deflects the respective input light beam at one of a plurality of different angles being selected in a same plane by changing an inclination angle of the deflector and outputs the respective deflected input light beam at an angle determined by the deflector;

a collimated light output section capable of reflecting said deflected input light beams and outputting each deflected and reflected light beam as a collimated light beam having one of a plurality of optical axes being in a relationship of parallel translation to each other, said one of a plurality of optical axes being defined in accordance with the respective selected angle; and an output direction-path guide section for guiding the collimated light beams from said collimated light output section to respective output direction paths in accordance with the respective optical axis.

9. An optical switching device comprising:

an input light deflection section comprising multiple movable deflection members, each respective deflection member being capable of deflecting one of a plurality of input light beams at one of a plurality of different angles being selected in a same plane, and outputting the respective deflected input light beam;

a collimated light output section capable of reflecting said plurality of deflected input light beams and outputting said deflected and reflected light beams as collimated light beams, where each collimated light beam has one of a plurality of optical axes being in a relationship of parallel translation to each other, said one of a plurality of optical axes being defined in accordance with the respective selected angle; and an output direction-path guide section for guiding the collimated light beams from said collimated light output section to respective output direction-paths in accordance with the respective optical axis;

wherein the angle of each light beam deflected at the input reflection section is independent of the wavelength of the respective input light beam.

10. An apparatus comprising:

a plurality of deflectors deflecting input light beams at respective deflection angles, where each respective deflection angle is selected from a plurality of different deflection angles in a same plane;

a collimated light output section reflecting the deflected input light beams so that the reflected input light beams are collimated light beams having respective optical axes, where each respective optical axis is determined from a plurality of optical axes in parallel translation to each other in accordance with the respective selected deflection angle; and an output direction path guide section guiding the collimated light beams to respective output direction paths in accordance with the respective optical axis, the apparatus thereby operating as an optical switch to switch the input light beams from inputs of the apparatus to the respective output direction path;

wherein the respective deflection angle of each light beam deflected at the input light reflection section is independent of the wavelength of the respective input light beam.

11. An optical switching device comprising:

a plurality of first ports, each of the plurality of first ports having an output end for emitting a light beam inputted from the other end of the first port, and the plurality of first ports are disposed on a straight line directed in a first direction;

a plurality of second ports, each of the plurality of second ports having an input end for receiving a light beam, and the plurality of second ports are disposed on a straight line directed in a second direction approximately perpendicular to the first direction;

an input light deflection section capable of deflecting an input light beam emitted from one of the plurality of first ports at one of a plurality of different angles being selected in a same plane and outputting said deflected input light beam;

a collimated light output section capable of reflecting said deflected input light beam and outputting said deflected and reflected light beam as a collimated light beam having one of a plurality of optical axes being in a relationship of parallel translation to each other, said one of the plurality of optical axes being defined in accordance with said selected angle; and an output direction path guide section for guiding the collimated light beam in accordance with said one of a plurality of optical axes from said collimated light output section to a second port which is selected among the plurality of second ports.

12. The optical switching device according to claim 11, wherein the first ports, the second ports, the input light deflection section, the collimated light output section, and the output direction path guide section are arranged so that a light beam inputted to a discretional first port of the first ports can be outputted from a discretional second port of the second ports.

13. The optical switching device according to claim 11, wherein the output direction path guide section further comprises:

an optical condenser capable of condensing the collimated light beam; and an output light deflection section capable of deflecting the collimated light beam to a desired second port which is selected among the plurality of second ports.

14. The optical switching device according to claim 13, wherein in the collimated light output section, the optical condenser and an optical path between the collimated light output section and the optical condenser are formed integrally as a single block.

15. An optical switching device comprising:

a plurality of input light deflection sections arrayed in a first direction in a relationship of parallel translation to each other, wherein each of the plurality of input light deflection sections capable of deflecting an input light at one of a plurality of different angles being selected in a same plane, and outputting a deflected input light beam, wherein each of the plurality of input deflection sections deflects the input light beam in a second direction substantially perpendicular to the first direction;

a plurality of collimated light output sections arrayed in the first direction in a relationship of parallel translation to each other, wherein each of the plurality of collimated light output sections capable of reflecting said deflected input light beam and outputting said deflected and reflected light beam as a collimated light beam having one of a plurality of optical axes being in a relationship of parallel translation to each other, said one of the plurality of optical axes being defined in accordance with said selected angle, wherein the optical axes of the collimated light beam collimated by each collimated light output section are disposed in the second direction in a relationship of parallel translation to each other; and an output direction path guide section for guiding the collimated light beam from said collimated light output section to an output direction path in accordance with said one of the plurality of optical axis, wherein the output direction path guide section is able to select at least one directional collimated light beam among a plurality of collimated light beams from the collimated light output section and output the selected light beam through the output direction-path.

* * * * *